US008538376B2

(12) United States Patent
Lee et al.

(10) Patent No.: US 8,538,376 B2
(45) Date of Patent: Sep. 17, 2013

(54) EVENT-BASED MODES FOR ELECTRONIC DEVICES

(75) Inventors: Michael M. Lee, San Jose, CA (US); Justin Gregg, San Francisco, CA (US); Casey Maureen Dougherty, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1158 days.

(21) Appl. No.: 12/005,822

(22) Filed: Dec. 28, 2007

(65) Prior Publication Data

US 2009/0170532 A1 Jul. 2, 2009

(51) Int. Cl.
*H04M 11/00* (2006.01)

(52) U.S. Cl.
USPC ........................................................ 455/405

(58) Field of Classification Search
USPC ........................................................ 455/405
See application file for complete search history.

(56) References Cited

U.S. PATENT DOCUMENTS

| 4,805,210 A | 2/1989 | Griffith, Jr. |
| 5,432,844 A | 7/1995 | Core et al. |
| 5,608,786 A | 3/1997 | Gordon |
| 5,615,213 A | 3/1997 | Griefer |
| 5,794,218 A | 8/1998 | Jennings et al. |
| 5,937,040 A | 8/1999 | Wrede et al. |
| 5,999,599 A | 12/1999 | Shaffer et al. |
| 6,044,081 A | 3/2000 | Bell et al. |
| 6,259,405 B1 | 7/2001 | Stewart et al. |
| 6,271,264 B1 | 8/2001 | Dhal et al. |
| 6,438,600 B1 | 8/2002 | Greenfield et al. |
| 6,526,293 B1 | 2/2003 | Matsuo |
| 6,545,596 B1 | 4/2003 | Moon |
| 6,564,261 B1 | 5/2003 | Gudjonsson et al. |
| 6,587,680 B1 | 7/2003 | Ala-Laurila et al. |
| 6,643,774 B1 | 11/2003 | McGarvey |
| 6,654,455 B1 | 11/2003 | Isaka et al. |
| 6,766,176 B1 | 7/2004 | Gupta et al. |
| 6,769,000 B1 | 7/2004 | Akhtar et al. |
| 6,798,874 B1 | 9/2004 | Ohlinger et al. |
| 6,816,469 B1 | 11/2004 | Kung et al. |
| 6,839,761 B2 | 1/2005 | Kadyk et al. |
| 6,847,715 B1 | 1/2005 | Swartz |
| 6,870,835 B1 | 3/2005 | Chen et al. |
| 6,876,734 B1 | 4/2005 | Summers et al. |
| 6,905,414 B2 | 6/2005 | Danieli et al. |
| 6,907,123 B1 | 6/2005 | Schier |
| 6,912,275 B1 | 6/2005 | Kaplan |
| 6,917,672 B2 | 7/2005 | Brown et al. |
| 6,918,034 B1 | 7/2005 | Sengodan et al. |
| 6,931,001 B2 | 8/2005 | Deng |
| 6,934,858 B2 | 8/2005 | Woodhill |

(Continued)

*Primary Examiner* — Nathan Mitchell
(74) *Attorney, Agent, or Firm* — Kilpatrick Townsend & Stockton LLP

(57) ABSTRACT

Event-based modes of operation are supported on an electronic device. One or more event-based modes of operation may be automatically or selectively applied to the device when a new life event is detected. The device's previous mode of operation may be backed up to the device or a network location and restored after the event-based mode of operation is no longer applied. The event-based modes of operation may be used to restrict access to certain applications or functionalities on the device, enforce or restrict certain user interface or other types of settings, and add or remove or rearrange the priority of device assets. The new life events associated with event-based modes of operation may be of various types, including location-based events, environment-based events, calendar-based events, news-based events, and usage-based events.

50 Claims, 17 Drawing Sheets

(56) References Cited

U.S. PATENT DOCUMENTS

| | | |
|---|---|---|
| 6,947,417 B2 | 9/2005 | Laursen et al. |
| 6,985,745 B2 | 1/2006 | Quaid et al. |
| 6,987,744 B2 | 1/2006 | Harrington et al. |
| 2001/0031633 A1* | 10/2001 | Tuomela et al. .............. 455/417 |
| 2002/0010008 A1 | 1/2002 | Bork et al. |
| 2002/0068537 A1 | 6/2002 | Shim et al. |
| 2002/0086680 A1 | 7/2002 | Hunzinger |
| 2002/0090926 A1* | 7/2002 | Pirkola et al. ................ 455/405 |
| 2002/0178228 A1 | 11/2002 | Goldberg |
| 2002/0198004 A1 | 12/2002 | Heie et al. |
| 2003/0008644 A1* | 1/2003 | Akhterzzaman et al. ..... 455/418 |
| 2003/0061496 A1 | 3/2003 | Ananda |
| 2004/0248586 A1 | 12/2004 | Patel et al. |
| 2005/0157708 A1 | 7/2005 | Chun |
| 2005/0177622 A1 | 8/2005 | Spielman et al. |
| 2005/0181808 A1* | 8/2005 | Vaudreuil .................. 455/456.3 |
| 2005/0272413 A1 | 12/2005 | Bourne |
| 2006/0034336 A1 | 2/2006 | Huh et al. |
| 2006/0058011 A1* | 3/2006 | Vanska et al. ............. 455/414.3 |
| 2006/0116175 A1 | 6/2006 | Chu |
| 2006/0215609 A1* | 9/2006 | Kyung et al. ................. 370/331 |
| 2007/0072598 A1* | 3/2007 | Coleman et al. ........... 455/422.1 |
| 2007/0275720 A1* | 11/2007 | Dei et al. .................. 455/435.2 |
| 2008/0064351 A1* | 3/2008 | Landschaft et al. ....... 455/187.1 |
| 2008/0165144 A1 | 7/2008 | Forstall et al. |

\* cited by examiner

| | Zone Name | Description | AutoApply | Condition | Expires | Ends | Defined Modes | Initial Mode | Event | Priority |
|---|---|---|---|---|---|---|---|---|---|---|
| 201 | AMC Theater (NYC-Manh) | Movie theaters within Manhattan operated by AMC | Y | 0 | 0 | 0 | T1,T2,T3 | T1 | WGS84_ptr1 | 4 |
| 203 | School Zone (NYC-All) | School zones within NYC | N | WhileDriving() | 0 | 0 | A1, A2 | S1 | WGS84_ptr2 | 2 |
| 205 | | Compliance: New York State Vehicle and Traffic Law Section 1225c | N | ValidHours() | 0 | 0 | S1, S2 | | | |
| 207 | NY State (NYS-All) | | Y | ValidHours() | 0 | 0 | NYS1 | NYS1 | WGS84_ptr3 | 1 |
| 209 | Quiet Zone (NYS-All) | Quiet Zone within NYS | N | | 0 | 0 | Q1, Q2 | Q1 | WGS84_ptr4 | 3 |
| 211 | Church Zone (US-All) | Church Zone within US | Y | | 0 | 0 | CH1, CH2 | CH1 | WGS84_ptr5 | 6 |
| 213 | User-Defined Zone A | My Zone (at home) | Y | ValidHours() | 24 days | 0 | UD1 | UD1 | WGS84_ptr6 | 5 |
| 215 | Wedding Anniversary | Anniversary date of wedding | Y | 0 | 0 | End Time() | WA1 | WA1 | CLNDR_ptr1 | 8 |
| 217 | Temperature (>90°C) | Device temperature exceeds 90° Celsius | Y | 0 | 0 | 0 | TM1 | TM1 | ENVRN_ptr1 | 7 |
| 219 | Emails (Recvd>20w/60s) | Device receives more than 20 emails within 60 seconds | Y | 0 | 0 | 0 | EM2, ST13 | EM2 | USAGE_ptr1 | 10 |
| 221 | ABC Stock (>$100/share) | ABC stock exceeds $100 per share | Y | 0 | 0 | 0 | ST2B | ST13 | NEWS_ptr1 | 9 |

FIG. 2

EVENT-BASED MODES FOR ELECTRONIC DEVICES

FIELD OF THE INVENTION

This can relate to systems and methods for supporting various event-based modes of operation on an electronic device.

BACKGROUND OF THE DISCLOSURE

One benefit of electronic devices (e.g., personal computers and portable telephones) is their ability to perform many various tasks. For example, certain electronic devices may perform multiple functions, such as play music, display video, store pictures, receive and transmit telephone calls, and the like. Another benefit of electronic devices, particularly portable electronic devices, is the ability of a user to take such devices wherever he or she goes. For example, a portable electronic device may accompany a user while he or she is traveling in an automobile, airplane, train, or any other type of vehicle. Sometimes, the portable electronic device may even be physically attached or strapped to the user so that the device may be accessible at all times. In other circumstances, the portable electronic device may be carried by the user, for example, in a pocket, article of clothing, purse, or bag. Because of the ease of portability of such electronic devices, a portable electronic device may accompany its user in almost every facet of life.

In some instances, however, certain functions or settings of an electronic device may not be appropriate or authorized depending on the situation or environment in which the user may find himself or herself. For example, the user may be inside a movie theater where the use of an electronic device may be discouraged or inappropriate. As another example, the user may be operating a motorized vehicle, at which time the use of an electronic device may be unsafe or even illegal. As yet another example, a user may be attending a live concert where using the electronic device for recording purposes is strictly prohibited.

Moreover, in some instances, certain assets of an electronic device may not be appropriate or authorized depending on the situation or environment in which the user may find himself or herself. For example, the user may be in China and the contact information stored on the device for the user's friends residing in the United States may not be as useful to the user as may be the contact information for the user's friends in China. As still yet another example, certain assets or functionalities may be useful and added to or enabled on the device upon detecting a new life event, such as emergency contact information for a particular city upon the device entering that city.

Due to the unlimited number of different situations a user may encounter in his or her lifetime, existing electronic devices are unable to automatically adapt to all of them. In addition, existing electronic devices are inadequate for automatically enabling or disabling certain functions of the electronic device and/or for automatically altering the priority or availability of certain assets available to the device based on, for example, the location or environmental conditions of the device (or of the user associated with the device). Accordingly, what is needed are systems and methods for supporting various event-based modes of operation on an electronic device in response to detecting various life events.

SUMMARY OF THE DISCLOSURE

Systems and methods for supporting various event-based modes of operation on an electronic device in response to detecting various life events are provided.

According to one embodiment, a method for supporting event-based modes of operation on an electronic device includes accessing life event information associated with the electronic device. The method also includes determining, based at least in part on the accessed life event information, if the electronic device is experiencing at least one new event. Furthermore, in response to determining that the electronic device is experiencing the at least one new event, the method also includes applying at least one event-based mode of operation to the electronic device.

According to another embodiment, a method for supporting event-based modes of operation on an electronic device includes detecting a wireless network with the electronic device. The method also includes accessing an identification of at least one event-based mode of operation associated with the wireless network, presenting a listing comprising the identification of the at least one event-based mode of operation, and receiving a user selection of the at least one event-based mode of operation from the listing. Furthermore, in response to receiving the user selection, the method also includes applying the at least one event-based mode of operation to the electronic device.

According to one embodiment, a system for supporting event-based modes of operation on an electronic device comprises memory configured to store defined event information about at least one new event. The system also comprises the electronic device. The electronic device of the system comprises a life event detection module configured to determine at least one life event condition of the electronic device. The electronic device of the system also comprises a control module coupled to the life event detection module. The control module is configured to access the defined event information about the at least one new event, compare the at least one life event condition of the electronic device to the defined event information about the at least one new event, and apply at least one event-based mode of operation to the electronic device based at least in part on the comparison.

BRIEF DESCRIPTION OF THE DRAWINGS

The above and other advantages of the invention will be apparent upon consideration of the following detailed description, taken in conjunction with accompanying drawings, in which like reference characters refer to like parts throughout, and in which:

FIG. 2 is an illustrative data structure listing defined zones in accordance with one embodiment of the invention;

DETAILED DESCRIPTION OF THE DISCLOSURE

In view of the foregoing, systems and methods for supporting various event-based modes of operation on an electronic device in response to detecting various life events are provided and described with reference to FIGS. 1-9.

Figure 1:
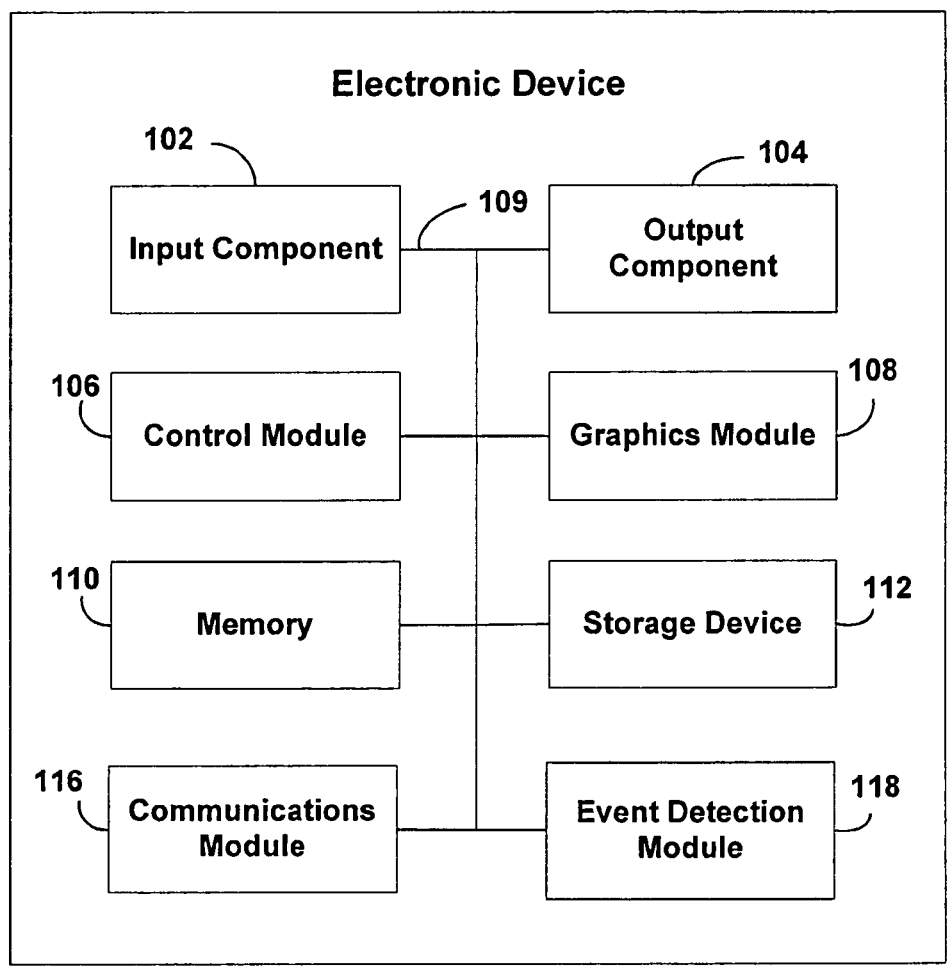
FIG. 1 is an illustrative block diagram of an electronic device in accordance with one embodiment of the invention.

FIG. 1 shows an embodiment of electronic device 100 that may be compatible with the event-based modes of the invention. Electronic device 100 can include, but is not limited to any device or group of devices, such as music players, video players, still image players, game players, other media players, music recorders, video recorders, cameras, other media recorders, radios, medical equipment, domestic appliances, transportation vehicle instruments, calculators, cellular telephones, other wireless communication devices, personal digital assistants, programmable remote controls, pagers, laptop computers, desktop computers, printers, and combinations thereof. In some cases, electronic device 100 may perform a single function (e.g., a device dedicated to playing music) and, in other cases, electronic device 100 may perform multiple functions (e.g., a device that plays music, displays video, stores pictures, and receives and transmits telephone calls).

Moreover, in some cases, electronic device 100 may be any portable, mobile, hand-held, or miniature electronic device having a user interface constructed according to an embodiment of the invention that allows a user to use the device wherever the user travels. Miniature electronic devices may have a form factor that is smaller than that of hand-held electronic devices, such as an iPod™ available by Apple Inc. of Cupertino, Calif. Illustrative miniature electronic devices can be integrated into various objects that include, but are not limited to, watches, rings, necklaces, belts, accessories for belts, headsets, accessories for shoes, virtual reality devices, other wearable electronics, accessories for sporting equipment, accessories for fitness equipment, key chains, and combinations thereof. Alternatively, electronic device 100 may not be portable at all, but may instead be generally stationary, such as a desktop computer or television.

Electronic device 100 may include, among other components, input component 102, output component 104, control module 106, graphics module 108, bus 109, memory 110, storage device 112, communications module 116, and event detection module 118. Control module 106 may communicate with the other components of electronic device 100 (e.g., via bus 109) to control the operation of electronic device 100. In some embodiments, control module 106 may execute instructions stored in memory 110. Control module 106 may also be operative to control the performance of electronic device 100. Control module 106 may include, for example, one or more software applications, a processor, a microcontroller, and/or a bus (e.g., for sending instructions to the other components of device 100). In some embodiments, control module 106 may also drive the display and process inputs received from input component 102.

Memory 110 may include one or more different types of memory that can be used to perform device functions. For example, memory 110 may include cache, flash memory, ROM, RAM, and/or hybrid types of memory. Memory 110 may also store firmware for device 100 and its applications (e.g., operating system, user interface functions, and processor functions).

Storage device 112 may include one or more suitable storage mediums or mechanisms, such as a magnetic hard drive, flash drive, tape drive, optical drive, permanent memory (e.g., ROM), semi-permanent memory (e.g., RAM), or cache. Storage device 112 may be used for storing assets, such as audio and video files, pictures, graphics, contact information, or any other suitable user-specific or global information that may be used by electronic device 100. Storage device 112 may also store programs or applications that may run on control module 106, may maintain files formatted to be read and edited by one or more of the applications, and may store any additional files that may aid the operation of one or more applications (e.g., files with metadata). It should be understood that any of the information stored on storage device 112 may instead be stored in memory 110.

Electronic device 100 may also include input component 102 and output component 104 for providing a user with the ability to interact with electronic device 100. For example, input component 102 and output component 104 may provide an interface for a user to interact with an application running on control module 106. Input component 102 may take a variety of forms including, but not limited to, a keyboard/keypad, trackpad, mouse, click wheel, button, stylus, or touch screen. Input component 102 may also include one or more devices for user authentication (e.g., a smart card reader, fingerprint reader, or iris scanner) as well as an audio input device (e.g., a microphone) or a visual input device (e.g., a camera or video recorder) for recording video or still frames. Output component 104 may include a liquid crystal display ("LCD"), a touch screen display, speaker, or any other suitable system for presenting information or media to a user. Output component 104 may be controlled by graphics module 108. Graphics module 108 may include, for example, one or more software applications, a video card, such as a video card with 2D, 3D, or vector graphics capabilities. In some embodiments, output component 104 may also include an audio component that is remotely coupled to electronic device 100. For example, output component 104 may include a headset, headphones, or earbuds that may be coupled to electronic device 100 with a wire or wirelessly (e.g., Bluetooth™ headphones or a Bluetooth™ headset).

Electronic device 100 may have one or more applications (e.g., software applications) stored on storage device 112 or in memory 110. Control module 106 may be configured to execute instructions of the applications from memory 110. For example, control module 106 may be configured to execute a media player application that causes full-motion video or audio to be presented or displayed on output component 104. Other applications resident on electronic device 100 may include, for example, a telephony application, a GPS navigator application, a web browser application, and a calendar or organizer application. Electronic device 100 may also execute any suitable operating system, and can include a set of applications stored on storage device 112 or memory 110 that is compatible with the particular operating system.

The applications available to a user of electronic device 100 may be grouped into application suites. The suites may include applications that provide similar or related functionalities. For example, the applications in one suite may include word processing and publishing applications (e.g., Keynote™ and Pages™ within the iWork™ suite available by Apple Inc.), and another suite may include media editing tools (e.g., iWeb™ within the iLife™ suite available by Apple Inc.). The applications within a given suite may have similar properties and other features that associate each application in a suite with the other applications in that suite. For example, the applications may feature a similar look and feel, may include a similar user interface, may include related features or functions, may allow a user to easily switch between the applications in the suite, or include any suitable combination of the foregoing.

Although embodiments of the invention are generally described in terms of a single application, it should be understood that any of the features or functionalities of an application may be general to one or more of the applications in a suite. Alternatively, they may be general to one or more applications across a group of suites. When an event-based mode of operation is applied to an electronic device according to the invention (e.g., electronic device 100), the event-based mode of operation may disable or enable access to one or more applications on the electronic device, or the event-based mode of operation may enhance, enable, disable, restrict, or limit one or more certain functionalities associated with an application or application suite.

In some embodiments, electronic device 100 may also include communications module 116 to connect to one or more communications networks. Communications module 116 may be any suitable communications module operative to connect device 100 to a communications network and to receive and/or transmit communications (e.g., voice or data) to and/or from other devices or systems within the communications network. Communications module 116 may be operative to interface with the communications network using any suitable communications protocol including, but not limited to, Wi-Fi™ (e.g., a 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), global system for mobile communications ("GSM"), enhanced data rates for GSM evolution ("EDGE"), code division multiple access ("CDMA"), quadband, and other cellular protocols, voice over internet protocol ("VOIP"), hypertext transfer protocol ("HTTP"), BitTorrent, file transfer protocol ("FTP"), rapid transport protocol ("RTP"), real-time streaming protocol ("RTSP"), secure shell protocol ("SSH"), rich site summary or really simple syndication protocol ("RSS"), any other suitable communications protocol, or any combination thereof.

In some embodiments, communications module 116 may be operative to create a communications network using any suitable communications protocol. For example, communications module 116 may create a short-range communications network using a short-range communications protocol to connect to other devices or systems. For example, communications module 116 may be operative to create a local communications network using the Bluetooth™ protocol to couple with a Bluetooth™ headset. Communications module 116 may also include a wired or wireless network interface card ("NIC") configured to connect to the Internet or any other public or private network. Communications module 116 may also include one or more software applications.

For example, electronic device 100 may be configured to connect to the Internet via a wireless network, such as a packet radio network, an RF network, a cellular network, or any other suitable type of network. Communications module 116 may be used to initiate and conduct communications with other communications devices or media players or systems within a communications network.

Electronic device 100 may also include any other component suitable for performing a communications operation. For example, electronic device 100 may include a power supply, an antenna, ports or interfaces for coupling to a host device, a secondary input mechanism (e.g., an ON/OFF switch), or any other suitable component. Communications module 116 can also include circuitry that enables device 100 to be electrically coupled to another device (e.g., a computer or an accessory device) and communicate with that other device.

An event-based mode of operation supported on an electronic device (e.g., electronic device 100) in accordance with the invention may be one or a combination of many different types of modes of operation. For example, an event-based mode of operation may define a set of one or more enabled and disabled functions or settings on the electronic device. Alternatively, an event-based mode of operation may identify only the one or more functions or settings that are enabled or only the one or more functions or settings that are disabled on the device in that particular mode. Functions or settings may include, but are not limited to, any input functionality (e.g., microphone, accelerometer, keypad, keyboard, mouse, trackpad, trackball, or touch screen functions), any output functionality (e.g., audio levels or display types), any application function (e.g., access to a location detection application, a communication application, or a recording application), or any combination of the aforementioned types of functionalities. For example, audio settings, display settings, and access to particular applications running on the electronic device are all functions that may be selectively enabled, disabled, or adjusted by an event-based mode of operation in accordance with the invention.

As another example, an event-based mode of operation may alter the priority or availability of one or more assets accessible to a user of the electronic device. Assets may include, but are not limited to, any media assets (e.g., songs, podcasts, or other audible media items, videos, video games, pictures, literature, news articles, or other viewable media items, etc.), any electronic communication assets (e.g., voicemails, e-mails, text messages, instant messages, contact information, etc.), any other various assets (e.g., links to various web pages on the internet, or applications, software, or hardware capabilities of the device, etc.), or any combination of the aforementioned types of assets. For example, a list of all songs, a list of songs of a particular genre, a list of all contacts with telephone numbers, and a list of e-mails received by the device are all types of asset listings that may have one or more assets selectively reordered or reprioritized therein, added thereto, removed therefrom, and/or cued by an event-based mode of operation in accordance with the invention.

One or more event-based modes of operation may be applied to an electronic device in response to detecting that the device is experiencing, or has experienced, one or more new life events. For example, a new life event of an electronic device that may be detected in accordance with the invention can include, but is not limited to, any location-based event (e.g., the device entering or exiting a specific geographical location, such as a country, or a specific type of location, such as a movie theater, etc.), any environment-based event (e.g., the device being subjected to a specific physical orientation, movement, temperature, sound, light, etc.), any calendar-based event (e.g., the device reaching a specific time of day, day of week, date, etc.), any usage-based event (e.g., the device being used for a specific function, for a specific period of time, the device's battery having less than half of its capacity remaining, etc.), any news-based event (e.g., the device receiving information about a particular worldly occurrence, such as a weather forecast, news report, or sport score, etc.), and combinations thereof.

Each life event may be detected by an electronic device in one or more various ways in accordance with the invention including, but not limited to, the use of one or more location or environment sensors or other detection circuitries at least partially integrated into the device itself (see, e.g., event detection module 118 of device 100, as will be described in more detail below), the use of communication circuitry to receive information from external sources (e.g., communications module 116 of device 100), or combinations thereof.

As mentioned, some or all of the modes of operation applied to an electronic device may be in response to a detected location-based life event. In such a case, the device may include an event-detection module with one or more location sensors. For example, the device may be a global positioning system ("GPS")-enabled electronic device that may include a GPS receiver. Such a device may access a GPS application function call that returns the geographic coordinates (i.e., the geographic location) of the device. The geographic coordinates may be fundamentally, alternatively, or additionally derived from any suitable trilateration or triangulation technique. Based on the detected geographic location of the device, various modes of operation may be defined. On the other hand, an electronic device may detect a news-based life event by receiving information from an external source, such as the Associated Press, through a web feed, for example, via a wireless internet connection.

Some or all of the modes of operation applied to an electronic device in accordance with the invention may be in response to a detected environment-based life event. In such a case, the device may include an event-detection module with one or more environmental sensors for detecting position, movement, or some other environmental characteristic of the device or its surroundings. Similarly, some or all of the modes of operation applied to an electronic device in accordance with the invention may be in response to a detected usage-based life event. In such a case, the device may include an event-detection module with one or more usage sensors that, for example, may count the number of times that an event has occurred, has not occurred, or should have occurred. Likewise, some or all of the modes of operation applied to an electronic device in accordance with the invention may be in response to a detected calendar-based life event. In such a case, the device may include an event-detection module with one or more temporal sensors that may clock or detect temporal events.

In some embodiments, custom event-based modes of operation may be defined for the device. Custom event-based modes of operation may be defined by a manufacturer of the device, a user of the device, or a third party. For example, an operator of a movie theater may define various event-based modes of operation for devices present at his or her establishment, such as one device mode of operation for pre-showtime, one device mode for the preview period, one device mode for the feature movie period, and one device mode for post-showtime. The number of modes, as well as the configuration characteristics of each mode (e.g., the functionality restrictions and/or asset arrangements associated with each mode) may be set by the operator. Modes may be added or removed in real-time from an administration interface (e.g., an administrative application or website) in some embodiments.

The characteristics of a mode of operation may be prestored on the device, downloaded to the device using any communication mechanism available to the device, or a combination thereof. For example, if the device has access to the Internet or any other public or private network (e.g., using communications module 116 of device 100), custom modes of operation for the device may be transmitted to the device periodically or after the device experiences a life event of some kind.

Each detected life event may be associated with one or more mandatory modes of operation, one or more permissible modes of operation, or a combination of mandatory and permissible modes. A mandatory mode of operation may be automatically applied to any electronic device that detects a life event associated with that mandatory mode. Attempting to change any functionality implicated or restricted by a mandatory mode may be restricted while the mandatory mode is still valid (e.g., while the device is still in a geographical location associated with the mandatory mode). For example, parents may choose to restrict their children from using an electronic device as a telephone when at home.

In some embodiments, an authorized user may input a valid password (or use any other authentication device or supply an authentication token) in order to override the application of a mandatory mode. External authentication, including smart card and biometric authentication (e.g., fingerprint, iris, or retinal scans), may also be used in some embodiments to override the application of a mandatory mode of operation. In some embodiments, a mandatory mode may be associated with an expiration date or expiration time. The mandatory mode may then expire at the expiration date or time, at which point the mandatory mode may become a permissive mode for the life event that originally caused the mode of operation to be applied.

If only permissible modes of operation are defined for a particular detected life event, a user may select to apply any of the permissible modes of operation to the device. Details about the available permissible modes (including device settings, application restrictions, and/or asset alterations in each mode) may also be automatically displayed on the device after it detects a life event with at least one event-based mode defined. For example, when a user enters a new location, an event-based mode management application on his or her device may be automatically activated to provide a listing of all the modes associated with that particular location (e.g., a web browser on the device may be automatically directed to a website that includes a listing of all the modes associated with that particular location).

In addition or as an alternative to being GPS-enabled, an electronic device may be able to detect location-based life events in various other ways in accordance with the invention. For example, a device may determine its location using various measurements (e.g., signal-to-noise ratio ("SNR") or signal strength) of a network signal (e.g., a cellular telephone network signal) associated with the device. For example, a radio frequency ("RF") triangulation detector or sensor integrated with or connected to the electronic device may determine the approximate location of the device. The device's approximate location may be determined based on various measurements of the device's own network signal, such as: (1) the angle of the signal's approach to or from one or more cellular towers, (2) the amount of time for the signal to reach one or more cellular towers or the user's device, (3) the strength of the signal when it reaches one or more towers or the user's device, or any combination of the aforementioned measurements, for example. Other forms of wireless-assisted GPS (sometimes referred to herein as enhanced GPS or A-GPS) may also be used to access location information associated with an electronic device.

In some embodiments, a device may determine its location based on a wireless network or access point that is in range or a wireless network or access point to which the device is currently connected. For example, because wireless networks have a finite range, a network that is in range of the device may indicate that the device is located in the approximate geographic location of the wireless network. In some embodiments, the device may automatically connect to a wireless network that is in range in order to receive the valid modes of operation for that location. In some embodiments the valid mode information could fundamentally, alternatively, or additionally be broadcast (e.g., the service set identifier ("SSID") of a Wi-Fi AP could indicate a movie theater). The device may also receive an indication of which mode (of the valid modes for that location) is a mandatory mode, if a mandatory mode of operation has been defined. The mandatory mode may then be automatically applied to the device. In some embodiments, as mentioned, a mandatory mode may be associated with an expiration date or expiration time. The mandatory mode may then expire at the expiration date or time, at which time the mandatory mode may become a permissive mode for that location.

As an electronic device moves from one location to another, the device may enter the range of a new wireless network. The device may then access the valid modes of operation from the new wireless network and apply one of these new modes to the device while the device is in range of that network (or until a new mode of operation is received by another network or applied due to the detection of any other type of new life event).

In some embodiments, the configuration characteristics (e.g., the functionality restrictions and/or asset arrangements) associated with one or more modes of operation may be saved to the device, to a network location, or both. For example, the configuration characteristics of a current mode of operation on the device may be backed up to a storage component of the device and/or to a network location before applying a new mode of operation. In this way, the device's prior mode of operation may be automatically restored at some later time. For example, when a user leaves a location with a mandatory mode of operation, the user's prior mode of operation (e.g., the device's mode of operation before entering the new location) may be restored. Thus, the user may not need to reconfigure his or her electronic device to its previous state after the event-based mode of operation is no longer required or desired.

As another example, when a user customizes certain configuration characteristics of his or her device, the user may save those characteristics as a customized mode of operation to the device, to a network location, or both, while at the same time associating the customized mode with one or more particular life events. Therefore, whenever the device detects one or more of those particular life events, the customized mode of operation as saved by the user may be applied to the device. For example, when a user enters a particular building for the first time and he or she alters configuration characteristics of a device's mode of operation, the user may choose or be prompted to save that new mode of operation and associate it with the life event of being in that particular building. Thus, every time that the user re-enters that particular building, that user-created mode of operation may be applied to his or her device.

A life event (e.g., a location-based event, calendar-based event, environment-based event, usage-based event, news-based event, etc.) with at least one event-based mode of operation associated therewith (e.g., either a mandatory or permissible mode of operation) is sometimes referred to herein as a "zone." A location-based zone, for example, may include any suitable location and may be defined by any suitable location information from which a location may be derived. In some embodiments, location information may include geographic coordinates specified in the World Geodetic System 1984 ("WGS 84") standard. Any other suitable standard may also be used to define geographic coordinates in other embodiments. These standards may utilize any suitable reference system and any suitable reference ellipsoid. Location-based zones may be defined by bounded coordinates or by a geographic zone center and corresponding distances from the zone center in one or more compass directions. Other types of event-based zones may also be defined in one or more various ways.

In some embodiments, a single event-based zone may include more than one bounded event. A single location-based zone may include more than one bounded geographic region. For example, a "hands-free" zone may be defined that includes the geographic locations of all the states with traffic laws or traffic regulations requiring the use of a hands-free device while driving a motor vehicle. As such, a single location-based zone may include more than one contiguous or non-contiguous geographic region. Likewise, a single calendar-based zone may include more than one bounded range of time. For example, a "bi-weekly board meeting" zone may be defined that includes the time from 12:00 PM EST to 3:00 PM EST both on Tuesday and Thursday (i.e., the times during which the meeting takes place). As such, a single calendar-based zone may include more than one contiguous or non-contiguous range of time.

Some location-based zones may be defined by the signal strength of a wireless network located within the zone. For example, all electronic devices within range of a particular wireless network or access point may be considered within that location-based zone. After the signal strength of a new network increases above some threshold signal strength, the electronic device may automatically connect to the new network and download the valid modes of operation for the new location-based zone. Alternatively or additionally, the valid mode information may not need to be downloaded, but may simply be associated with the SSID or encoded in the SSID of the network signal. In such embodiments, geographic coordinates may not be defined for each zone. Rather, a zone entry and exit system may be used, where the electronic device enters a location-based zone when it crosses a first wireless network and exits the location-based zone when it crosses a second wireless network (or enters a new network). The first and second networks may be associated with zone identifiers so that the electronic device may determine which location-based zone it is entering or exiting.

Zones may be co-existent with (or partially overlap) other zones. For example, one location-based zone may be defined to include Saint Patrick's Cathedral in New York City (and its immediately surrounding area, in some embodiments), while another location-based zone may be defined to include all of New York City. Each of these location-based zones may be associated with one or more modes of operation. As another example, one environment-based zone may be defined to include an ambient temperature detected by the device between 30° Celsius and 90° Celsius, while another environment-based zone may be defined to include an ambient temperature detected by the device between 10° Celsius and 110° Celsius. Each of these environment-based zones may be associated with one or more event-based modes of operation.

When two or more zones are co-existent with, partially overlap, or are consecutive with one another, the application of the one or more event-based modes of operation associated with these zones may create an escalating effect in accordance with the invention. For example, a first calendar-based zone may be defined to include the entire week leading up to a birthday (e.g., March 20th through March 26th for a March 26th birthday), while a second calendar-based zone may be defined to include the last three days leading up to the birthday (e.g., March 24th through March 26th for a March 26th birthday), while a third calendar-based zone may be defined to include the birthday itself (e.g., March 26th for a March 26th birthday). Each of these calendar-based zones may be associated with one or more event-based modes of operation. For example, the first calendar-based zone may be associated with a first calendar-based mode of operation that slightly increases the priority of the song "Happy Birthday" in a playlist of the device and that moves the contact information for the person whose birthday is on March 26th into the top third of a contact list on the device. The second calendar-based zone may be associated with a second calendar-based mode of operation that puts a picture of the person whose birthday is on March 26th on the display screen of the device and adds contact information for florists into the top third of a contact list on the device. Finally, the third calendar-based zone may be associated with a third calendar-based mode of operation that increases the priority of the song "Happy Birthday" to the top of the playlist of the device and moves the contact information for florists into the top tenth of the contact list on the device. In this way, the importance of the birthday associated with these three calendar-based zones may be escalated throughout the application of the modes of operation associated with these zones.

Because an electronic device may detect or be in multiple event-based zones at the same time, in some embodiments, zones may be assigned zone priorities. Zones with higher zone priorities may preempt zones with lower zone priorities (or zones without a zone priority assigned). In some embodiments, location-based zone priorities may be automatically assigned based on the size of the zone. For example, smaller zones (e.g., the Saint Patrick's Cathedral zone) may automatically preempt larger zones (e.g., the New York City or New York State zone). In other embodiments, zones may be assigned custom zone priorities by, for example, the entity that created the zone or the event-based mode of operation associated with that zone (e.g., the manufacturer of the device, the user of the device, or a third party, such as the authority governing the zone).

In addition to geographic location-based zones or physical location-based zones, location-based zones may also be defined to include locations of a similar type or locations sharing one or more common characteristics. Such a zone may be dynamically detected based on information from a remote database of location types, such as Google Maps™, in some embodiments. For example, a church zone may be defined that includes all the known churches in a geographic area. Since certain electronic device functions (e.g., talking on a cellular telephone or viewing full-motion video with associated audio) may be inappropriate or discouraged at all churches, the church zone may restrict all electronic devices in that location-based zone to one or more valid modes of operation that disable those functions.

As mentioned above with respect to being within multiple location-based zones, an electronic device may simultaneously detect multiple new life events or event-based zones of various types. Therefore, in some embodiments, life events and zones may be assigned priorities. Those with higher priorities may preempt those with lower priorities (or those without a priority assigned). In other embodiments, life events and zones may be assigned custom priorities by, for example, the entity that created the zone or the event-based mode of operation associated with that zone or life event (e.g., the manufacturer of the device, the user of the device, or a third party, such as the authority governing the zone).

In some embodiments, as with detecting a new life event, after the electronic device enters a new zone, a zone profile or zone definition identifying the configuration characteristics of valid event-based modes of operation for that zone may be downloaded to or recognized by the electronic device and/or accessed from a storage component of the electronic device. The profile or definition associated with a zone or life event may take a standardized format to facilitate portability and compatibility of the information with a wide range of electronic devices. In addition to specifying the valid modes of operation for the zone or life event, the profile or definition may also include references to assets (e.g., digital audio and video files or contact information) or applications to be downloaded or synchronized to (or alternatively, deleted from) the electronic device when applying the one or more event-based modes of operation.

A batch download or deletion of the asset content referenced by the profile may be automatically initiated after the device detects the associated new life event or events, for example. The asset content may also be automatically removed from, or alternatively restored to, the device after the device stops detecting the new life event or exits a zone. Therefore, in some embodiments, when a device detects a new event-based zone, an associated mode of operation may be applied to the device that loads or synchronizes one or more new assets associated with that zone to the device. For example, when a device detects a new location-based event when it has entered Chicago, Ill., a batch of information related to Chicago may be automatically loaded by the device, such as local police and restaurant contact information. As another example, when a device detects a new calendar-based event, such as it currently being the user's wedding anniversary, a mode of operation associated with that event may not only cue the user's wedding song in a media player playlist on the device, but the mode of operation may also load the contact information of florists located within 10 miles of the device.

Therefore, as shown in FIG. 1, electronic device 100 may also include event detection module 118. Although event detection module 118 may be implemented in software in some embodiments, module 118 may also be implemented in hardware, firmware, or any combination of software, hardware, and firmware in other embodiments. For example, event detection module 118 may include an application process, thread, or subroutine configured to compute the one or more various types of new life event information with respect to electronic device 100 (e.g., location-based event information, environment-based event information, calendar-based event information, news-based event information, usage-based event information, etc.).

For example, as mentioned, the location of electronic device 100 may be derived from any suitable trilateration or triangulation technique, in which case event detection module 118 may include a GPS receiver, RF triangulation detector or sensor, or any other location circuitry configured to determine the geographic or physical location of electronic device 100. Event detection module 118 may also communicate with (e.g., via communications module 116) one or more remote servers or communications networks to determine the geographic or physical location of electronic device 100. Module 118 may also include the associated applications to support the location circuitry.

As mentioned, environment-based zones may also be defined and triggered after one or more predefined environmental conditions have been detected. Therefore, event detection module 118 may additionally or alternatively include one or more environmental sensors, circuitries, and/or software applications for detecting the position, orientation, movement, or other environmental-based event information or environmental conditions of electronic device 100. Such sensors and circuitries may include, but are not limited to, one or more single-axis or multi-axis accelerometers, angular rate or inertial sensors (e.g., optical gyroscopes, vibrating gyroscopes, gas rate gyroscopes, or ring gyroscopes), magnetometers (e.g., scalar or vector magnetometers), light sensors, temperature sensors, pressure sensors, infrared ("IR") sensors, linear velocity sensors, thermal sensors, microphones, ambient light sensors ("ALS"), proximity sensors, capacitive proximity sensors, acoustic sensors, sonic or sonar sensors, radar sensors, image sensors, video sensors, GPS detectors, radio frequency ("RF") detectors, RF or acoustic doppler detectors, RF triangulation detectors, electrical charge sensors, peripheral device detectors, event counters, and/or combinations thereof. For example, control module 106 may be configured to read data from one or more of the sensors or circuitries in event detection module 118 in order to determine the orientation or velocity of electronic device 100, and/or the amount or type of light, heat, or sound that device 100 is being exposed to, and the like.

Environmental conditions may also be received from a component or system external to electronic device 100 (e.g., via communications module 116). For example, in some embodiments, electronic device 100 may interface with a vehicle's control system (e.g., via a wireless network within the vehicle) and access such information as the vehicle's speed and direction. This information may be processed by the electronic device (e.g., event detection module 118) to determine if an environmental condition defining an environment-based life event has been met. Satisfying any suitable environmental condition may signal a new zone entry or egress.

Usage-based zones may also be defined and triggered after one or more predefined usage conditions have been detected. Therefore, event detection module 118 may additionally or alternatively include one or more usage sensors, circuitries, and/or software applications, such as an event counter that may count the number of times that an event has occurred, has not occurred, or should have occurred with respect to the device. For example, a usage counter may detect if a user fails to answer a telephone call after several alert instances using a particular vibration pattern, or if a user has received a certain amount of e-mails from a certain party within a certain period of time. Module 118 may detect when electronic device 100 has been used in a certain way. A usage sensor of module 118 may also include, for example, a signal strength detector (e.g., a battery charging sensor to determine how much capacity of a device's battery is remaining or a light strength sensor to determine how bright the device's display is able to shine).

Manufacturers of the device, users of the device, and third parties may each define what types of device usage conditions should be detected as a usage-based life event according to the invention. For example, a user may choose to disable his or her device's ability to transmit or receive telephone calls if the device has not transmitted or received a telephone call within the last five hours, for example. Therefore, when the device detects that it has not transmitted or received a telephone call within the last five hours, a usage-based mode of operation may be applied to the device that powers down its telephony circuitry (e.g., in order to conserve the life of the device's battery by powering down its telephony circuitry).

Moreover, calendar-based zones may also be defined and triggered after one or more predefined calendar conditions have been detected. Therefore, event detection module 118 may additionally or alternatively include one or more temporal sensors, circuitries, and/or software applications for detecting calendar-based event information of electronic device 100. For example, a temporal sensor may include, without limitation, a clock, differential clock, counter, differential counter, calendar, and combinations thereof. Event detection module 118 may include or communicate with (e.g., via communications circuitry 118) one or more calendars or clocking systems (e.g., iCal™ available by Apple Inc. of Cupertino, Calif. or MeetingMaker™ available by PeopleCube™ of Waltham, Mass.). Such calendars may include the ability to clock the time of day, day of the week, and place within one or more types of yearly calendar systems.

Manufacturers of the device, users of the device, and/or third parties may each populate the calendar with specific occurrences that may be associated with one or more life events. For example, a user may enter a particular family member's birthday into the calendar and define a calendar-based life event to be detected when that day occurs. Therefore, when the device detects that it is currently the same day as the birthday, an event-based mode of operation may be applied to the device that, for example, rearranges a contact list on the device so that the particular family member's contact information is at the top of the list. Alternatively, the calendar-based mode of operation may be configured to be applied a certain amount of time before or after a specific date in the calendar (e.g., 3 days before a birthday, or two days after a product's release date).

News-based zones may also be defined and triggered after one or more predefined newsworthy conditions have been detected. Therefore, event detection module 118 may additionally or alternatively include one or more sensors, circuitries, and/or software applications for detecting news-based event information of electronic device 100. For example, event detection module 118 may include or communicate with (e.g., via communications module 116) one or more news or information sources (e.g., via RSS or any other type of web feed format). Such news sources may include the ability to provide real-time or substantially real-time information regarding events occurring around the world.

Manufacturers of the device, users of the device, and third parties may each select what types of information and/or sources of information are allowed to communicate with the device and potentially be detected as a news-based life event according to the invention. For example, a user may subscribe to an RSS feed from his or her favorite financial instrument news source and define a news-based life event to be detected when the price of a particular stock is reported to be below a certain price. Therefore, when the device detects that the stock has indeed been reported to be below the defined price, an event-based mode of operation may be applied to the device that, for example, rearranges a contact list on the device so that the contact information for the user's stock broker is at the top of the device's contact list or changes the playback priority of a set of media files on the device.

FIG. 2 shows data structure 200 for storing new life event information. Although data structure 200 takes the form of a table in a relational database in the example of FIG. 2, any other data structure may be used in other embodiments. Data structure 200 takes the form of a table storing various types of event-based zone information, including location-based zone information, environment-based zone information, calendar-based zone information, usage-based zone information, and news-based zone information. Data structure 200 may be stored on electronic device 100 (FIG. 1), for example, in memory 110 (FIG. 1) or storage device 112 (FIG. 1). Alternatively or additionally, some or all of data structure 200 may be located on some external system or other device and may be communicated to device 100 (e.g., via communications module 116).

Figure 5:
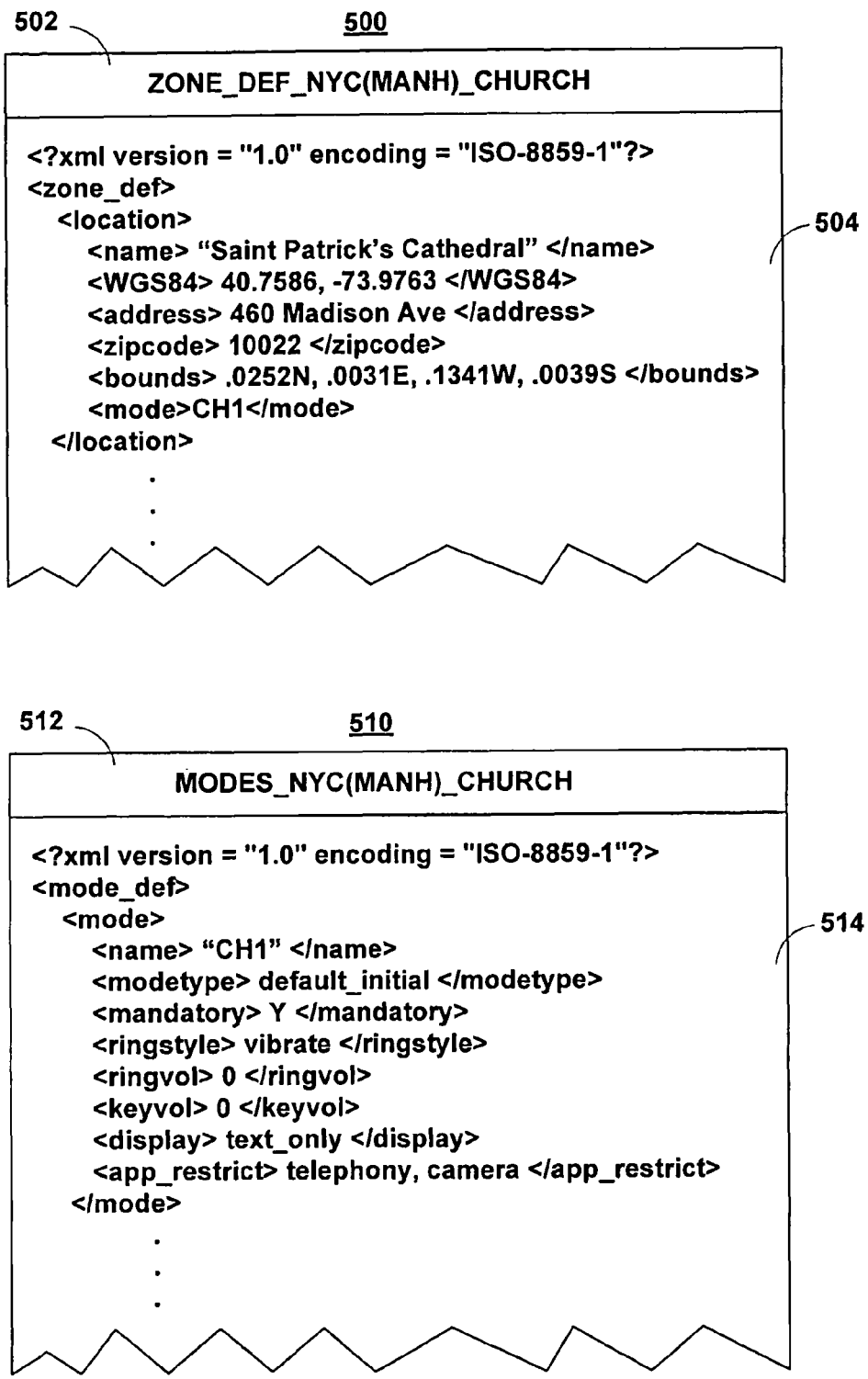
FIG. 5 shows illustrative zone and mode definitions in accordance with one embodiment of the invention.

Zones may be added or removed from data structure 200 in real-time using an interface of electronic device 100 (FIG. 1) or an administrative interface (not shown). The administrative interface may be maintained or operated by a network or location-based zone operator. New zone definitions may be created via the administrative interface and transmitted to an electronic device at any time. For example, as described in more detail below, FIG. 5 shows zone definition file 500, which may take the form of a mark-up language file. After a new zone definition has been received by the electronic device, it may update its zone table (e.g., data structure 200).

In the example of FIG. 2, data structure 200 may include zone name column 202, zone description column 204, auto apply column 206, condition column 208, expiration column 210, exit column 212, defined modes column 214, initial mode column 216, event column 218, and priority column 220. Zone name column 202 may include a unique alphanumeric zone name or identifier. Zone description column 204 may include a text description of each zone. For example, as shown in FIG. 2, zone name column 202 may include "AMC Theater (NYC-Manh)" to indicate that this zone covers a particular location (see, e.g., row 201). Zone description column 204 may then include a user-friendly description of the zone, such as "Movie theaters within Manhattan operated by AMC."

Auto apply column 206 may include a boolean value that may indicate whether or not the zone includes a mandatory mode of operation that should be automatically applied to all electronic devices entering that zone. Condition column 208 may define one or more optional conditions (e.g., one or more environment-based or calendar-based conditions) that must be met in order for the zone to apply. For example, some zones may only apply during certain hours, in which case the "ValidHours( )" function may be called to verify that this zone condition is presently met (see, e.g., row 207).

As another example, some zones may only apply when a measured value of an environmental condition of the electronic device meets at least a first threshold level for that condition or falls within an acceptable range of values for that environmental condition. Some zones may only apply when the electronic device is oriented in a certain position, traveling at a certain velocity, exposed to a certain temperature or sound or light intensity, or is experiencing another particular environmental condition. For example, the "WhileDriving( )" function may be called to determine if the electronic device is presently in a moving vehicle (see, e.g., row 205). This function may interface with a vehicle control system or a wireless network within the vehicle. In some embodiments, if the vehicle is turned on (or the key is in the ignition), the "WhileDriving( )" function may return the boolean true value.

This function may also determine the number of passengers (other than the vehicle operator) currently in the vehicle. For example, seats within the vehicle may be connected to one or more seat occupancy sensors that may determine which seats are currently occupied by an animate object. For example, a cover or mat containing the sensor may be built into the seat. The cover or mat may be designed so that its electrical resistance changes as a function of the pressure or force acting on it. As another example, the seat occupancy sensor may include a piezoelectric cable encapsulated in a seat cover or mat. In this way, an occupant's pulse or respiratory movements could be detected to permit differentiation between animate and inanimate objects in the seat. Any other manual or automatic seat occupancy sensors may be used in other embodiments.

If the only animate object detected in the vehicle is the operator of the vehicle, the "WhileDriving( )" function may always return true while the vehicle is in operation (e.g., while the engine is running or the key is in the ignition). If other animate objects are detected in the vehicle, in some embodiments, the electronic device may attempt to determine which seat the mobile device is closest to using, for example, RF triangulation or a time difference of arrival technique with the vehicle's wireless network signal. Based on the estimated location of the device within the vehicle, the "WhileDriving( )" function may attempt to determine if the user currently operating the device is the person operating the vehicle.

Moreover, condition column 208 may define one or more optional conditions with respect to any other type of event that has been or is currently being detected or experienced by device 100 (e.g., one or more location-based events, environment-based events, calendar-based events, usage-based events, and/or news-based events) in order for the zone to apply. For example, some zones may only apply when a certain weather advisory alert has been transmitted (i.e., a news-based event), when it is detected that the device has transmitted/received telephone calls for at least ten hours in the last two days (i.e., a usage-based event), or when it is detected that it is a Sunday (i.e., a calendar-based event).

Expires column 210 may include an indication of the expiration date and/or time of the zone or life event. Some zones may never expire, in which the value of expires column 210 may be set to zero. In some embodiments, zones may be automatically removed from data structure 200 after the zone expires. For example, as shown, "User-Defined Zone A" of row 211 may expire in 24 days (e.g., "User-Defined Zone A" may be directed towards a zone at the user's home and the zone may only be wanted for the duration of entity E's stay at the user's home, and it is known that Entity E will be leaving user's home in 24 days).

Ends column 212 may define one or more optional conditions (e.g., one or more location-based, environment-based, calendar-based, usage-based, and/or news-based conditions) that must be met in order for the application of the zone to end. For example, the application of some zones, once applied, may only be stopped a certain amount of time after the zone is no longer detected (see, e.g., column 215, where the "End-Time( )" function may be called to verify that the device temperature has not exceeded 90° Celsius for a certain amount of time before the application of the zone "Temperature (>90° C.)" may end).

Defined modes column 214 may identify all the valid modes of operation for the zone. Modes of operation may be identified using a unique mode identifier. In the example of FIG. 2, mode identifiers may take the form of an alphanumeric mode key value, but any other unique mode identifiers may be used in other embodiments. Each mode identifier may uniquely identify a mode of operation on electronic device 100 (FIG. 1). The electronic device may use the mode identifier to access the mode definitions, which may include the various function settings, application restrictions, and/or asset alterations associated with that mode of operation, for example. Mode definitions are described in more detail below in regard to FIG. 5. The conditions of condition column 208 may be one or more optional conditions that must be met in order for certain defined modes of column 214 to be applied and not other defined modes of column 214. For example, the "ValidHours( )" condition of column 208 for row 207 may only be a condition for defined mode "Q1" of column 214 to be applied, while there may be no conditions for defined mode "Q2" of column 214 to be applied. In this way, the effect of one zone (e.g., the "Quiet Zone" zone of row 207) may be escalated by having various conditions met within the zone to change the amount and/or type of defined modes in column 214 that are available to a device in that zone.

Initial mode column 216 may include an indication of the initial mode for the zone. If the auto apply flag in auto apply column 206 is set, then the mode identified in initial mode column 214 may be the mode of operation that is automatically applied to the electronic device after the device enters the zone listed in zone column 202 (i.e., it is a mandatory mode).

Event column 218 may include an indication of the life event of the zone. For example, as described in more detail below, the geographic location-based life events of event column 218 for rows 201, 203, 205, 207, 209, and 211 may be defined using any suitable location information, such as geographic coordinates specified in, for example, WGS 84 standard. Because event information, such as this location information, may be lengthy, instead of specifying the actual event information in data structure 200, event column 218 may include a pointer, reference, or link to the location where the actual event information may be accessed. For example, event information may be saved on storage device 112 of device 100 (FIG. 1) or on a server or other device or system external to device 100.

As mentioned, some life events or zones may only apply when a measured value of a condition of the electronic device meets at least a first threshold level for that condition or falls within an acceptable range of values for that condition. Event information may describe at least the first threshold level for that condition, or the acceptable range or acceptable ranges of values for that condition. As shown, a calendar-based life event of event column 218 for row 213 may be defined as a calendar pointer to multiple ranges of values for a temporal condition. For example, the calendar pointer may be to information that describes all twenty-four hours of November 24th for every calendar year (e.g., 12:00 AM through 11:59 PM on Nov. 24, 2007, 12:00 AM through 11:59 PM on Nov. 24, 2008, 12:00 AM through 11:59 PM on Nov. 24, 2009, etc.). Likewise, as shown, an environment-based life event of event column 218 for row 215 may be defined as an environment pointer to a first threshold for an environmental condition. For example, the environment pointer may be to information that describes any detected device temperature above 90° Celsius. A usage-based life event of event column 218 for row 217 may be defined as a usage pointer to a first threshold for a usage condition. For example, the usage pointer may be to information that describes every situation when more than 20 e-mails are received by the device within any 60 second span. While a news-based life event of event column 218 for row 219 may be defined as a news pointer to a specific news requirement. For example, the news pointer may be to information that describes every situation when the stock for ABC Corporation is reported to exceed $100 per share.

The event information referenced in event column 218 for location-based events (e.g., at rows 201, 203, 205, 207, 209, and 211) may include bounded coordinates or the coordinates for the zone center with ranges in one or more compass directions. This location information may also include any other information that defines a geographic area. Some location-based zones may not be associated with this type of location information, but rather various other types of information that may describe the location of the event. For example, the bounds of some location-based zones may be defined by the SNR or signal strength of one or more wireless network signals. For these zones, event column 218 may be set to zero or a unique network identifier may be included in event column 218. In some embodiments, whenever an electronic device is within range of the network identified by the unique network identifier in event column 218, the device may be considered to be within that zone.

Finally, priority column 220 may specify a zone priority for each zone. As previously mentioned, the zone priority may be used to determine which mode of operation should be applied to the electronic device in the event that a device is in more than one zone or detecting more than one life event. For example, electronic device 100 (FIG. 1) may be simultaneously located in the Saint Patrick's Cathedral zone, the New York City zone, and the New York State zone. Alternatively, the electronic device may simultaneously detect two or more life events of differing types (e.g., the device may be located in the Saint Patrick's Cathedral zone, which may require a first location-based mode of operation, and the device may also be simultaneously detecting a calendar-based event, such as the fact that today is the user's anniversary, which may require a second calendar-based mode of operation).

If electronic device 100 (FIG. 1) is at any time detecting more than one zone and if more than one such zone is associated with a mandatory mode of operation, then a mode conflict may be signaled. In some embodiments, the mode conflict may be resolved in priority order, as determined by the value in priority column 220. The mode conflict may also be resolved in other ways in other embodiments. For example, a mode conflict application process resident on or external to electronic device 100 (FIG. 1) may analyze the device settings, asset alterations, functionality, and application restrictions implicated by each conflicting mode of operation. Each configuration characteristic associated with one conflicting mode that does not override a similar or related setting in one of the other conflicting modes may be applied to the device. Conflicting characteristics between two or more conflicting modes of operation may be resolved, for example, in favor of the most senior zone (i.e., the zone that the device has been located in the longest), in favor of the most restrictive setting, or in any other way. The mode conflict application process may automatically resolve mode conflicts after a conflict is signaled. It may then apply the resolved mode of operation on electronic device 100 (FIG. 1).

If a zone priority has not been associated with a zone in priority column 220, then the zone may be automatically assigned a zone priority relative to the other zones in data structure 200. The relative value of the assigned zone priority with respect to conflicting location-based zones may be computed based, at least in part, on the size of the zone without an associated zone priority. For example, the Saint Patrick's Cathedral zone may be assigned a higher relative zone priority than the New York City or New York State zones. Any other suitable algorithm for automatically assigning zone priorities may be used in other embodiments.

FIGS. 3A-3D show zone interfaces for defining new event-based zones and editing existing event-based zones. Although FIGS. 3A-3C particularly show interfaces for defining new location-based zones and editing existing location-based zones, any other type of event-based zones (e.g., environment-based, calendar-based, usage-based, news-based, etc.) may be similarly defined and edited in accordance with the invention.

Figure 3A:
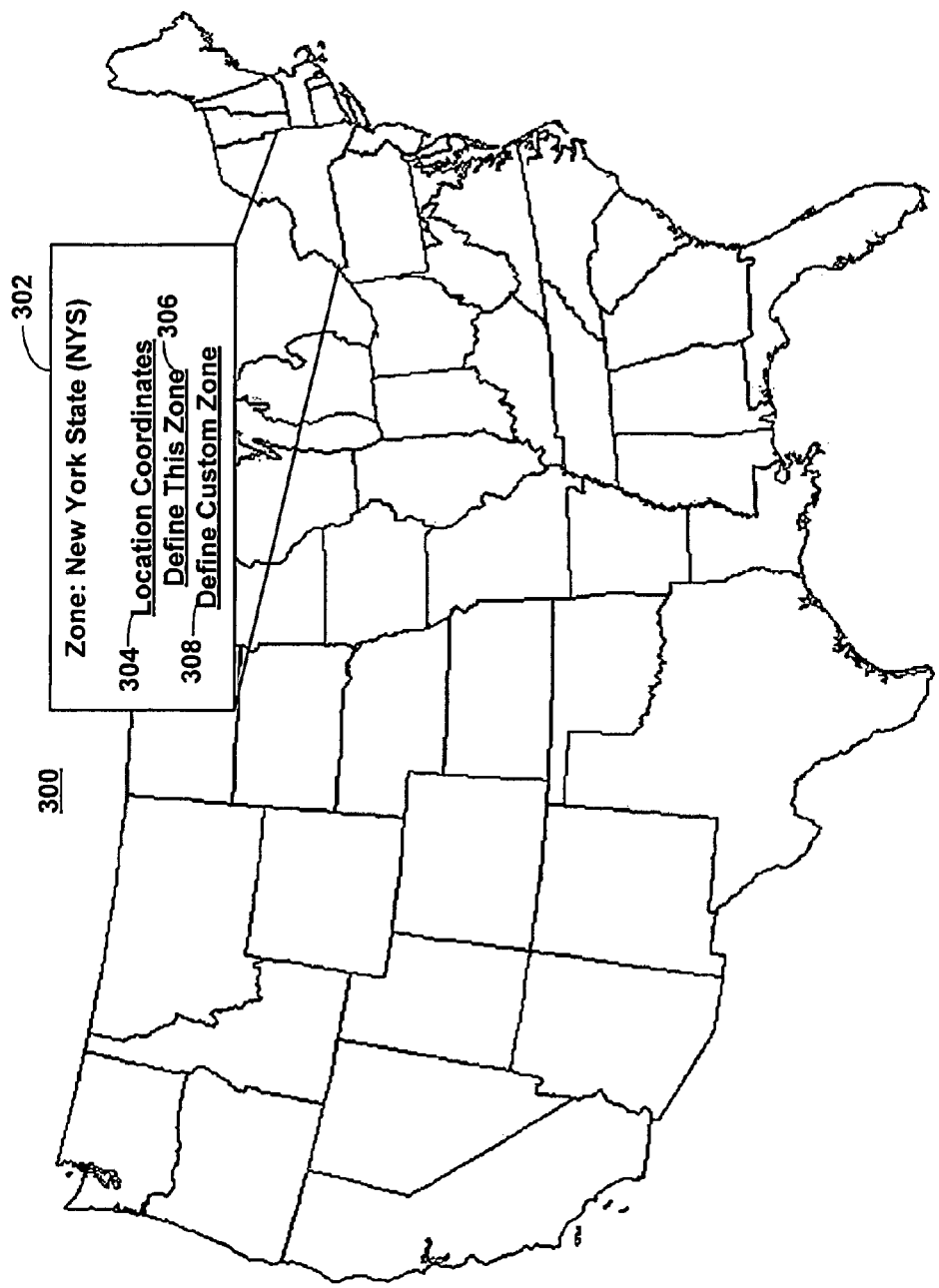
FIGS. 3A-3D are illustrative interfaces for defining and editing event-based zones in accordance with various embodiments of the invention.

As shown in the example of FIG. 3A, a user or anyone else (e.g., a manufacturer or third party) may navigate among the defined zones of an event-based zone listing or map 300, either on the electronic device itself (e.g., electronic device 100) or on an external device or system, for example, to access additional information about the zones. For example, zone map 300 may include zone details overlay 302. From zone details overlay 302, the user may select location coordinates option 304, define option 306, or custom zone option 308. After selecting location coordinates option 304, the geographic coordinates of the selected zone may be displayed to the user. For example, as shown in the example of FIG. 3A, the defined geographic coordinates for the New York State zone may be displayed to the user. The coordinates may be displayed in any suitable standard or format. For example, in one embodiment, geographic coordinates may be displayed to the user in WGS 84 standard. Bounded coordinates or coordinates for the zone center with distances in one or more compass directions may be displayed after selecting location coordinates option 304. The zones may be from one or more predefined zone types and gathered by a database search based on location. For example, the GPS coordinates of the detected location can be mapped to an approximate address, and then all nearby churches, theaters, and hospitals can be identified. Then, if the user is within a certain distance of one or more of these specific location types, a location-based event may be triggered.

To redefine the information of the selected zone, the user may select define option 306. After selecting define option 306, the user may manually input new geographic coordinates to associate with the selected location-based zone, for example. The user may also input new coordinates from a graphic map using a zone selection tool. The zone selection tool may display detailed zone maps at multiple levels of detail (e.g., global level, country level, state level, city level, and street level) so that the user may redefine the location-based zone as desired.

Access restrictions may prevent a user or device from redefining certain event-based zone details. For example, editing the coordinates of some location-based zones may require authentication. The user may authenticate himself or herself using any authentication protocol (e.g., username and password combination, smart card, or biometric authentication) available on electronic device 100 (FIG. 1), for example. In some embodiments, define option 306 may be disabled (e.g., grayed out) in zone details overlay 302 until the user has been properly authenticated.

Custom, user-defined event-based zones may be defined in some embodiments. After the user selects custom zone option 308, electronic device 100 (FIG. 1) may automatically execute a custom zone creation helper application. The custom zone creation helper application may guide the user through the custom zone creation process, including the steps of (1) naming the custom zone, (2) defining the zone information, (3) associating one or more modes of operation with the custom zone, (4) defining the modes of operation as either mandatory or permissive modes, (5) associating a zone priority with the zone, and (6) publishing the custom zone.

As described in more detail below with regard to FIG. 4, zone publication may allow the user to copy the zone details (e.g., the zone name, zone information, modes of operation, and zone priority) to a network server so that other users associated with other electronic devices, such as electronic device 100 (FIG. 1), may use the zone. Prior to publishing a zone, the user may again be authenticated to verify that the user has zone publication rights.

After location-based zone map 300 is displayed, the user may press an up or down arrow key or button associated with input component 102 (FIG. 1), for example, to scroll through all the defined zones on the device. As the user scrolls through the defined zones, the approximate geographic region associated with each zone may be highlighted (or otherwise visually distinguished) on zone map 300.

Figure 3B:

FIG. 3B shows zone map 320 at the city level. A user may zoom into a particular zone by selecting a zone category associated with a zone of interest. The user may then drill down to zone sub-categories in order to locate the desired zone. In the example of FIG. 3B, zone map 320 shows zones that may be associated with New York City. Zone selection overlay 322 may allow the user to select a sub-zone associated with New York City. For example, the user may navigate cursor 324 to select a particular borough within New York City. Alternatively, various other input methods, such as a touch screen, may be used instead of a cursor.

FIG. 3C shows zone map 330 again at the city level. Zone category overlay 332 may list several zone categories, such as church zones, school zones, quiet zones, and custom zones, that may be associated with the selected New York City borough. A user may navigate cursor 334 in order to view details on each zone category. For example, after navigating cursor 334 to "church zones," the defined church zones may be marked on zone map 330. The user may then view detailed settings (e.g., details on the modes of operation associated with each church zone) by selecting a particular zone within the zone category.

Figure 3C:
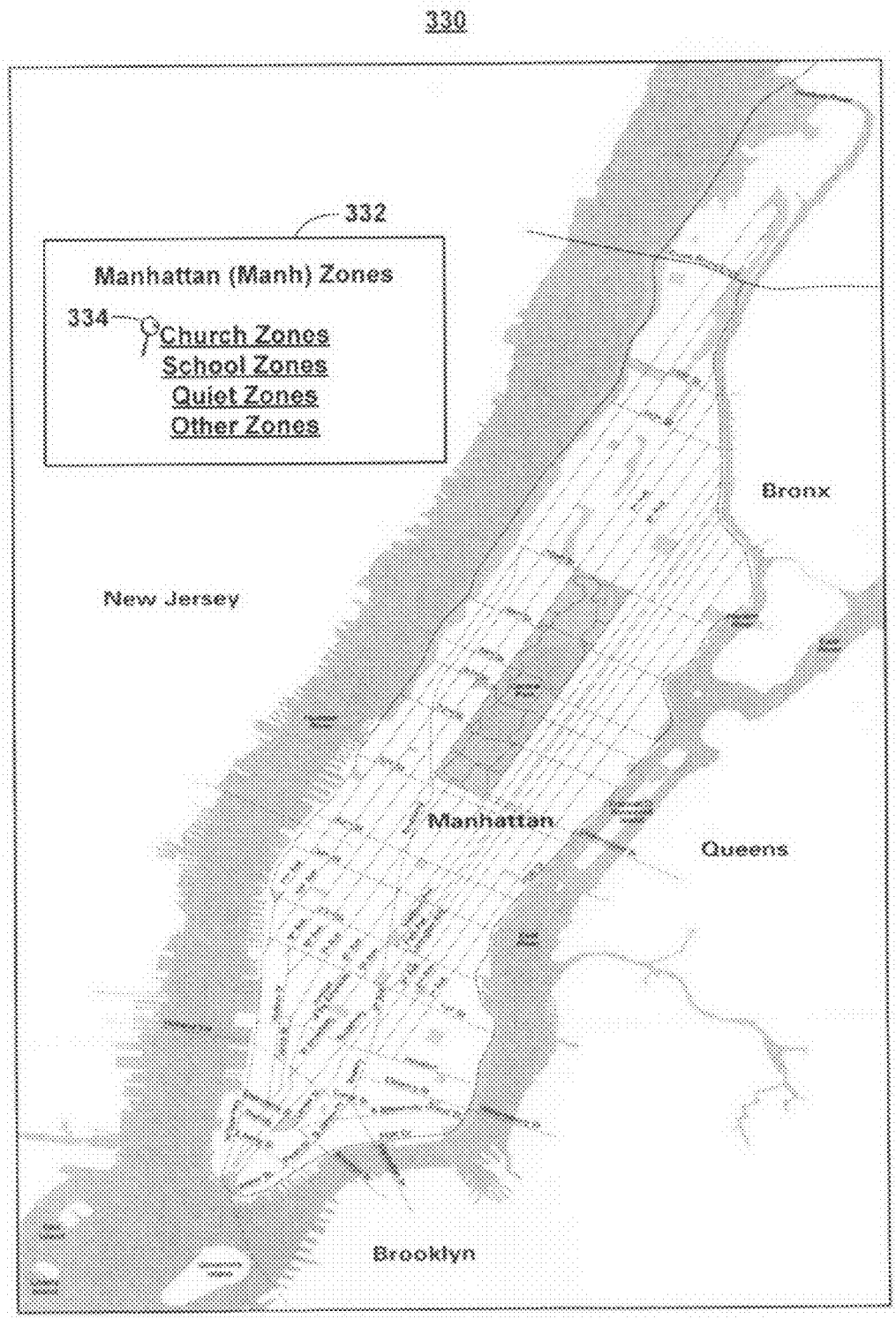

Although FIGS. 3A-3C particularly show interfaces for defining new location-based zones and editing existing location-based zones, any other type of event-based zones (e.g., environment-based, calendar-based, usage-based, news-based, etc.) may be similarly defined and edited in accordance with the invention. As another example, FIG. 3D shows a zone interface for defining new calendar-based zones and editing existing calendar-based zones.

Figure 3D:
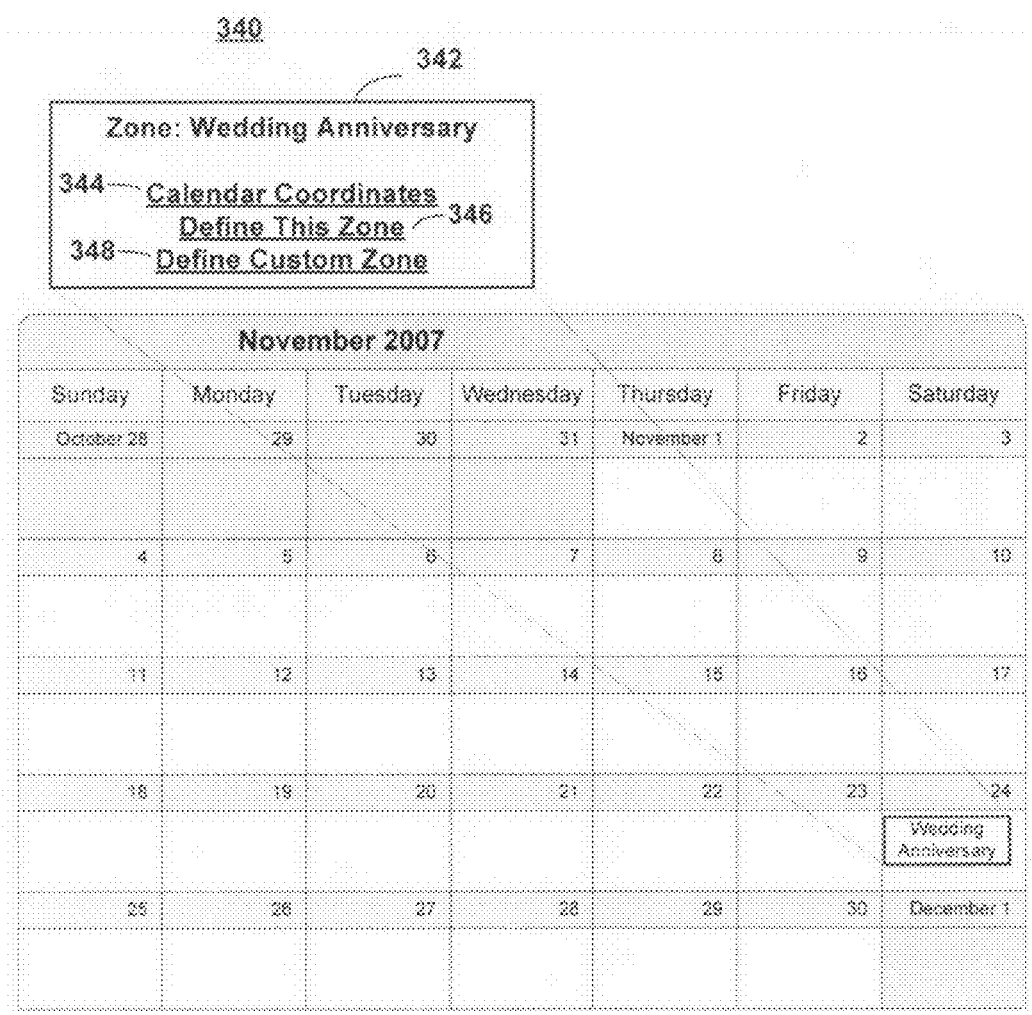

As shown in the example of FIG. 3D, a user or anyone else (e.g., a manufacturer or third party) may navigate a cursor among the defined zones of a event-based zone listing or calendar 340, either on the electronic device itself (e.g., electronic device 100) or on an external device or system, for example, to access additional information about the zones. For example, zone calendar 340 may include zone details overlay 342. From zone details overlay 342, the user may select calendar coordinates option 344, define option 346, or custom zone option 348. After selecting calendar coordinates option 344, the temporal coordinates of the selected zone may be displayed to the user. To redefine the information of the selected zone, the user may select define option 346. After selecting define option 346, the user may manually input new temporal coordinates to associate with the selected calendar-based zone, for example. The user may also input new coordinates from a calendar using a zone selection tool. The zone selection tool may display detailed zone calendars at multiple levels of detail (e.g., decade level, yearly level, monthly level, daily level, and hourly level) so that the user may redefine the calendar-based zone as desired. As with location-based zones, access restrictions may prevent a user or device from redefining certain location-based zone details. For example, editing the coordinates of some calendar-based zones may require authentication.

Custom, user-defined event-based zones may be defined in some embodiments. After the user selects custom zone option 348, electronic device 100 (FIG. 1) may automatically execute a custom zone creation helper application. The custom zone creation helper application may guide the user through the custom zone creation process, including the steps of (1) naming the custom zone, (2) defining the zone information, (3) associating one or more modes of operation with the custom zone, (4) defining the modes of operation as either mandatory or permissive modes, (5) associating a zone priority with the zone, and (6) publishing the custom zone.

As described in more detail below with regard to FIG. 4, zone publication may allow the user to copy the zone details (e.g., the zone name, zone information, modes of operation, and zone priority) to a network server so that other users associated with other electronic devices, such as electronic device 100 (FIG. 1), may use the zone. Prior to publishing a zone, the user may again be authenticated to verify that the user has zone publication rights.

After calendar-based zone map 340 is displayed, the user may press an up or down arrow key or button associated with input component 102 (FIG. 1), for example, to scroll through all the defined calendar-based zones on the device. As the user scrolls through the defined zones, the approximate temporal region associated with each zone may be highlighted (or otherwise visually distinguished) on zone calendar 340. Although FIG. 3D particularly shows an interface for defining new calendar-based zones and editing existing calendar-based zones, any other type of event-based zones (e.g., environment-based, usage-based, news-based, etc.) may be similarly defined and edited in accordance with the invention and may each have their own creation wizard application that may guide the user through the custom zone creation process.

Figure 4:
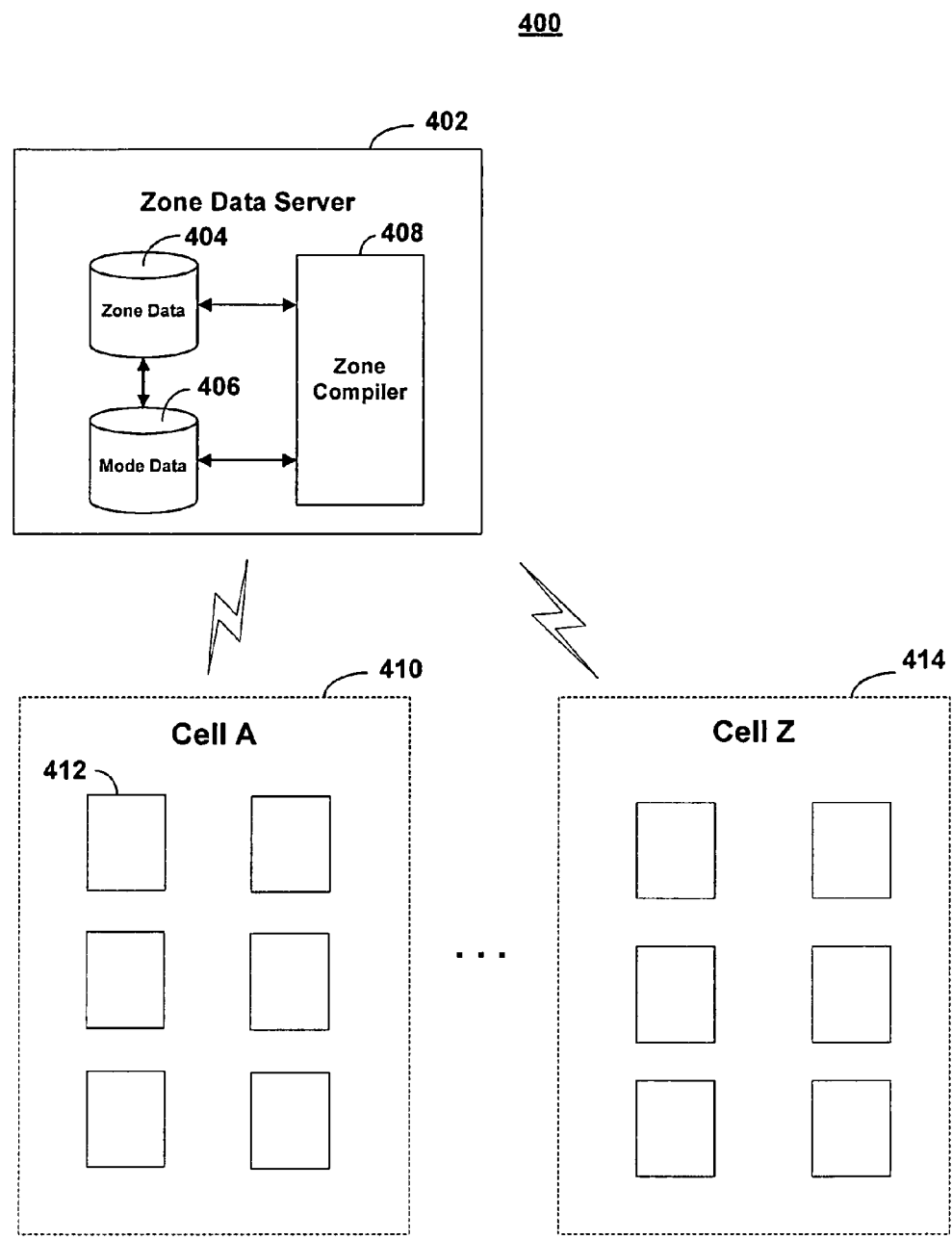
FIG. 4 is an illustrative event-based zone data server in accordance with one embodiment of the invention.

FIG. 4 shows a network 400 for supporting event-based modes of operation. Zone data server 402 may store zone data (e.g., geographic coordinate location-based event information) in zone database 404 and details about the modes of operation in mode database 406. Mode database 406 may include one or more tables indexed by mode identifier. The settings, functionalities, application restrictions, asset alterations, and any other type of characteristic configuration associated with each event-based mode of operation may also be stored in mode database 406.

Zone server 402 may include any network server, base station controller, or mobile switching center. In some embodiments, zone data server 402 may be a GPS assistance server that may narrow an electronic device's location down to a single cell site using cellular network information. In other embodiments, zone data server 402 may be a timed server that may trigger a calendar-based event when detected by an electronic device. In other embodiments, zone data server 402 may be any other event-based server that may trigger any type of life event (e.g., a location-based event, environment-based event, calendar-based event, usage-based event, news-based event, etc.) when the server is detected by an electronic device.

Zone compiler 408 may access information stored in zone database 404 and mode database 406 and create zone definitions and mode definitions. In some embodiments, zone definitions and mode definitions may take the form of a mark-up language file, such as an Extensible Markup Language (XML) file. Illustrative XML zone definition and mode definition files are shown in FIG. 5, described in more detail below.

Zone compiler 408 may transmit published zone definitions to one or more electronic devices, such as electronic device 412, in one or more cells, such as cells 410 and 414. Although only two cells have been depicted in the example of FIG. 4, zone data server 402 may service any number of cells. In some embodiments, zone and/or mode definitions may be synchronized to the electronic devices after information is added to or removed from zone database 404 or mode database 406. In other embodiments, zone definitions and mode definitions may be sent to the electronic devices in cells 410 and 414 periodically or after a new electronic device registers itself with a base station in the cell. For example, an electronic device entering cell 410 may automatically receive zone and mode definitions associated with that cell. While an electronic device remains in cell 410, any zone or mode changes associated with that cell may be automatically propagated to the device.

In some embodiments, the distribution of zone definitions and mode definitions may not be localized to particular cells. Rather, each device in all cells serviced by zone data server 402 may receive the same set of published zone definitions and mode definitions. Although local distribution of zone and mode definitions on the cell level may help reduce the network bandwidth used by the transmission, global distribution may simplify administration.

Zone data server 402 may transmit zone information and mode of operation information to electronic devices in cells 410 and 414 over any suitable transmission mechanism. For example, zone data server 402 may transmit zone and mode information over any suitable carrier frequency in a cellular telephone environment. In lieu of actually sending zone and mode information to the electronic devices, zone compiler 408 may make the zone and mode definitions available over the Internet, for example, on a website. Electronic devices, such as electronic device 412, may automatically connect to zone data server 402 over the Internet using protocols like HTTP, FTP, or SCP. The electronic devices may then download zone and mode definitions instead of these definitions being transmitted to the devices.

In some embodiments, users may send new zone information to zone data server 402 to adjust the zone details of an existing zone or to create a new zone. New zones created by users may first be created and then "published" so that the zones are available to other users and electronic devices. The user creating the zone may unpublish a zone at any time.

To access the modes of operation associated with a new zone, the electronic device may access data stored on zone data server 402. Alternatively, zone compiler 408 may automatically transmit such data to the electronic device after zone compiler 408 determines that the device has detected a new zone. Zone information (including associated modes of operation) for certain zones may alternatively or additionally be stored locally on the electronic device itself (e.g., in memory 110 or on storage device 112, both of FIG. 1). Therefore, in some embodiments, zone database 404 and/or mode database 406 of data server 402 may be stored locally on the electronic device itself, and may not require remote transmissions or downloads.

FIG. 5 shows zone definition file 500 and mode definition file 510. In the example of FIG. 5, zone definition file 500 and mode definition file 510 may take the form of XML files. Any other format may be used to define zones and modes of operation in other embodiments. Zone definition file 500 may be associated with a unique filename 502. Filename 502 may uniquely identify an event-based zone or zone category. In the example of FIG. 5, filename 502 uniquely identifies the Manhattan church location-based zone category.

Body 504 of zone definition file 500 may include one or more tags relating to the zone or zones within the zone category. In some embodiments, zone definition file 500 may include a number of zone definitions, with each zone definition including one or more mandatory tags and one or more optional tags. For example, the zone name (e.g., specified by the "name" tag), physical address (e.g., specified by the "address" tag), and geographic coordinates (e.g., specified by the "WGS84" tag) may be mandatory tags in some embodiments of a location-based zone definition. As previously mentioned, the geographic coordinates of a location-based zone may be specified in WGS 84 format or any other suitable format. The bounds or range of the location-based zone may also be specified in a "bounds" tag. The mode or modes of operation associated with the zone may be defined in one or more "mode" tags.

Although some location-based zones may include only a single geographic region, other location-based zones may include more than one bounded geographic region. Each region may be identified in zone definition file 500 using any suitable delimiter to separate the location information of the regions. For example, the coordinates for each region may be separated by a colon or semicolon in the "WGS84" tag in some embodiments. A similar delimiter may be used in the "bounds" tag, if needed. Any number of distinct geographic regions may be included in a zone.

Although body 504 of zone definition file 500 includes some of the most common tags, other tags may also be defined. For example, zone definition file 500 may also include an indication of any conditions for the zone. As previously described, some zones may only apply during specific hours or while the user is performing a specific activity (e.g., while the user is driving). Zone conditions may be included in one or more optional "condition" tags in zone definition file 500 (not shown). As another example, a priority may be associated with a zone, in which case a "priority" tag may also be defined and included in zone definition file 500 (not shown). Details about the modes of operation associated with the zone (e.g., the initial mode, any mandatory modes, and which mode, if any, should be automatically applied) may also be specified in body 504 of zone definition file 500.

Modes of operation may be defined in mode definition file 510. Each mode of operation may be associated with its own mode definition file, or modes of operation may be grouped into mode classes, where each mode class may include more than one mode of operation. Filename 512 may uniquely identify a mode or a mode class. Similar to body 504 of zone definition file 500, body 514 of mode definition file 510 may also include one or more mandatory tags and one or more optional tags.

In the example of FIG. 5, body 514 of mode definition file 510 includes a number of tags that may define the name of the mode of operation, the type of mode, and various mode characteristic configurations. For example, Table 1 below specifies some of the characteristics that may be configured in an event-based mode of operation, although any other adjustable device or configuration characteristic may also be defined in an event-based mode of operation according to the invention.

TABLE 1

Illustrative mode of operation characteristics.

| Tag Name | Description |
| --- | --- |
| ringstyle | The style of the ringer (e.g., loud, soft, vibrate, or silent) |
| ringtone | The ringtone used to announce incoming calls |
| ringvol | The volume of the ringer (e.g., numeric 0-10) |
| keyvol | The volume of key presses (e.g., numeric 0-10) |
| display | Display type, resolution, brightness, or restrictions (e.g., text-only, no video) |
| app_restrict | Application restrictions |
| handsfree | Use of hands-free device required |
| power | Device power (may require manual power on) |
| wi_fi | Enable or disable the Wi-Fi interface |
| edge_evdo | Enable or disable the EDGE/EVDO interface |
| add_asset | Add asset to the device (e.g., load new asset onto the device or enable a previously disabled asset) |
| remove_asset | Remove asset from the device (e.g., delete an asset from the device or disable a previously enabled asset) |
| cue_asset | Cue or launch one or more assets |
| rearrange_asset | Rearrange order or priority of on or more assets with respect to other assets within an asset grouping or list |
| alter_asset_presentation | Alter presentation of one or more assets |

The "ringstyle" tag may specify the style of one or more ringers associated with the electronic device. For example, this tag may specify that the ring style should be set to loud, vibrate, or silent. The "ringtone" tag may specify what ringtone is used for announcing one or more incoming calls. For example, all calls may be associated with a standard ringtone using this setting or custom ringtones may be defined for particular callers. This setting may override the custom ringtones that may be already defined for specific callers or groups of callers. The "ringvol" tag may specify the volume of any ringer associated with the electronic device. For example, using this setting, the ringer may be set to a numeric volume level (e.g., 0-9) or any other value. The "keyvol" tag may specify the volume associated with key presses of the input component of the electronic device. For example, using this setting, the volume of an audible alert associated with key presses may be set to a numeric volume level (e.g., 0-9) or any other value.

In the example of mode definition file 510, the mode of operation indicates that the ring style should be set to vibrate, the ring and key volumes set to silent, and the display should operate in text mode only. While in text mode, access to full-screen video may be disabled. Application restrictions may include one or more applications to which access is prohibited in that mode of operation or one or more functions on the device that are prohibited in that mode of operation.

For example, through the "app_restrict" tag, use of a device's camera or video functionality may be prohibited. This may be beneficial, for example, to organizers of a live concert who may wish to ban the use of audio or video recording devices (e.g., as a form of copyright control). By creating a location-based zone for the concert area and setting a restriction on camera use, access to camera functionality on all electronic devices supporting location-based modes of operation may be prohibited. Telephony applications may also be restricted so that the device will not make outgoing telephone calls or receive incoming calls while the mode of operation is applied. An option to allow emergency calls even if the telephony application is disabled may be provided.

In addition to defining various volume, application, and function restrictions, display restrictions may also be defined in a mode of operation. For example, some devices may support full-motion video playback. By setting the "display" tag to text-only, video playback may be prohibited in that mode. Any other display setting that is capable of being adjusted on the device may also be defined in a mode of operation. For example, the resolution of the display, brightness, and backlight settings may all be set in a mode of operation.

A "handsfree" tag may also be defined in mode definition file 510 (not shown). This tag may prohibit the use of a hands-free device (or alternatively require its use) while the mode of operation is applied to the device. For example, some states may have traffic laws or traffic regulations mandating the use of a hands-free set while driving. By creating a location-based zone encompassing the geographic location of one or more states with such a law (and setting the "handsfree" tag), states may facilitate compliance with traffic laws relating to the use of a hands-free device.

Modes of operation may also define which interface or interfaces should be enabled or disabled on the device while the mode of operation is applied. For example, a "wi_fi" tag may be included in mode definition file 510 (not shown). Depending on the value assigned to this tag, a Wi-Fi interface on electronic device 100 (FIG. 1) may be selectively enabled or disabled (optionally for a specified period of time starting from the application of the mode). Similarly, the device's EDGE or EVDO interface may also be enabled or disabled (optionally for a specified period of time starting from the application of the mode) in a mode of operation by setting the "edge-evdo" tag. Any other supported network interfaces (e.g., HSDPA/HSUPA and any 3G mobile network interfaces, if available), applications, software, or hardware available to the device may also be selectively enabled or disabled or even launched by setting corresponding tags in mode definition file 510.

A "power" tag may be defined in mode definition file 510 (not shown). This tag may shut down, power off, or suspend the device when the mode is applied (or after a specified period of time starting from the application of the mode). For example, school zones where the use of electronic devices is completely prohibited may set this tag to automatically power down all electronic devices located within the school zone. Authorized devices and users may override such a setting.

As another example, parents who would like to control their children's electronic device usage may set this tag so that the device is automatically powered down after N minutes of use, where N is any positive number. This feature, coupled with an authenticated login or access password, may effectively prohibit users from utilizing the electronic device for longer than a specified length of time after application of the mode of operation. In a typical usage scenario, parents may define a custom location-based zone encompassing their home. As soon as their children arrive home from school, a mandatory mode of operation may be applied to the children's' electronic devices. The application of this mandatory mode may start a timer within each device. When the timer reaches the specified length of time included in the "power" flag, the device may be configured to shut down, power off, or suspend all functionality. Alternatively, as opposed to a location-based mode of operation, parents may create a calendar-based mode of operation that would control their children's electronic device usage during certain hours of the day.

Modes of operation may also define which assets should be available to a user or even automatically launched on the device while the mode of operation is applied. For example, an "add_asset" tag may be included in mode definition file 510 (not shown). This tag may specify one or more new assets that should be loaded on to the device or one or more previously-disabled assets on the device that should be enabled. Similarly, modes of operation may also define which assets should not be available to a user on the device while the mode of operation is applied. For example, a "remove_asset" tag may be included in mode definition file 510 (not shown). This tag may specify one or more assets that should be removed from the device or one or more previously-enabled assets on the device that should be disabled. For example, a location-based mode of operation that is applied to a device when it enters a new city, for example, may automatically (or at the approval of the user) load one or more media assets on to the device. In one embodiment, when a device enters Beijing, China, an associated location-based mode of operation may load on to the device (and even begin to play) a podcast that describes recent events and forecasts expected weather conditions for Beijing. Conversely, the same location-based mode of operation may at the same time disable or remove from the device completely contact information for various businesses that are located in the United States (e.g., in order to simplify the user's contact lists by removing contacts that do not pertain to the location in which the user is currently situated). A "cue_asset" tag may also be included in mode definition file 510 (not shown). This tag may specify one or more assets that should be automatically launched or cued or queued (e.g., if the device is currently employing another asset) by the device (e.g., designate a song to be played or an application to be launched when the mode of operation is applied).

Modes of operation may also define which available assets should be made more easily discoverable by a user on the device while the mode of operation is applied. For example, a "rearrange-asset" tag may be included in mode definition file 510 (not shown). This tag may specify one or more assets whose priority should be increased or decreased with respect to one or more other assets available to a user on the device (e.g., by moving certain assets to the top or bottom of a listing or grouping of assets, such as a list of favorite internet links or a playlist of songs). As another example, an "alter_asset_presentation" tag may be included in mode definition file 510 (not shown). This tag may alter the way one or more assets are presented to a user with respect to the way one or more other assets are presented to the user (e.g., by displaying certain assets in a larger font or different color than other assets on a visual output component of the device).

As to which assets are added, removed, rearranged, or otherwise altered by an event-based mode of operation may be determined in various ways based on the detected event itself according to the invention. In one embodiment, an event-based mode of operation may rearrange the priority or order of songs in a user's playlist with consideration to the details of the event itself. For example, if a news-based mode of operation is applied in response to detecting a new weather forecast that calls for rain, songs with lyrics containing the word "rain" may be searched for and moved to the top of a music playlist on the device. In some instances, a song containing the word "rain" in its lyrics or title may even be automatically played in response to detecting the news-based event of a new weather forecast calling for rain. Additionally, a link to a webpage describing the forecast in more detail may even be loaded in a web browser on the device or at least added as a favorite link in a list of links on the device.

As another example, if a usage-based mode of operation is applied in response to detecting that the device has received a certain amount of e-mails from "entity X" within a certain amount of time, then contact information for entity X may be moved to the top of one or more contact lists on the device, or a telephone number associated with entity X may be automatically cued in a telephone application of the device and maybe even automatically dialed. As yet another example, if an environment-based mode of operation is applied in response to detecting that the device is moving with a certain velocity, songs with a tempo or beats-per-minute value that aligns with the detected velocity of the device may be searched for and moved to the top of a music playlist on the device or, alternatively may even be automatically played in response to detecting the environment-based event. As yet still another example, if a calendar-based mode of operation is applied in response to detecting that it is a certain time of day, contact information assets for entities that are generally not available after that detected time of day may be removed from one or more contact lists of the device, may be dropped to the bottom of one or more contact lists, or may have its accessibility removed from the device altogether in response to detecting the calendar-based event, for example.

Table 1 and the foregoing description describe some of the more common characteristic configurations that may be included in an event-based mode of operation according to the invention. Any combination of the foregoing characteristics (as well as various other device characteristics) may also be included in an event-based mode of operation of the invention. The characteristics of an event-based mode of operation may be automatically applied to an electronic device only while the device is detecting the new event associated with that mode, or the characteristics of an event-based mode of operation may be automatically applied to the electronic device for a certain amount of time after the device initially detects the new event associated with that mode, for example.

Figure 6A:
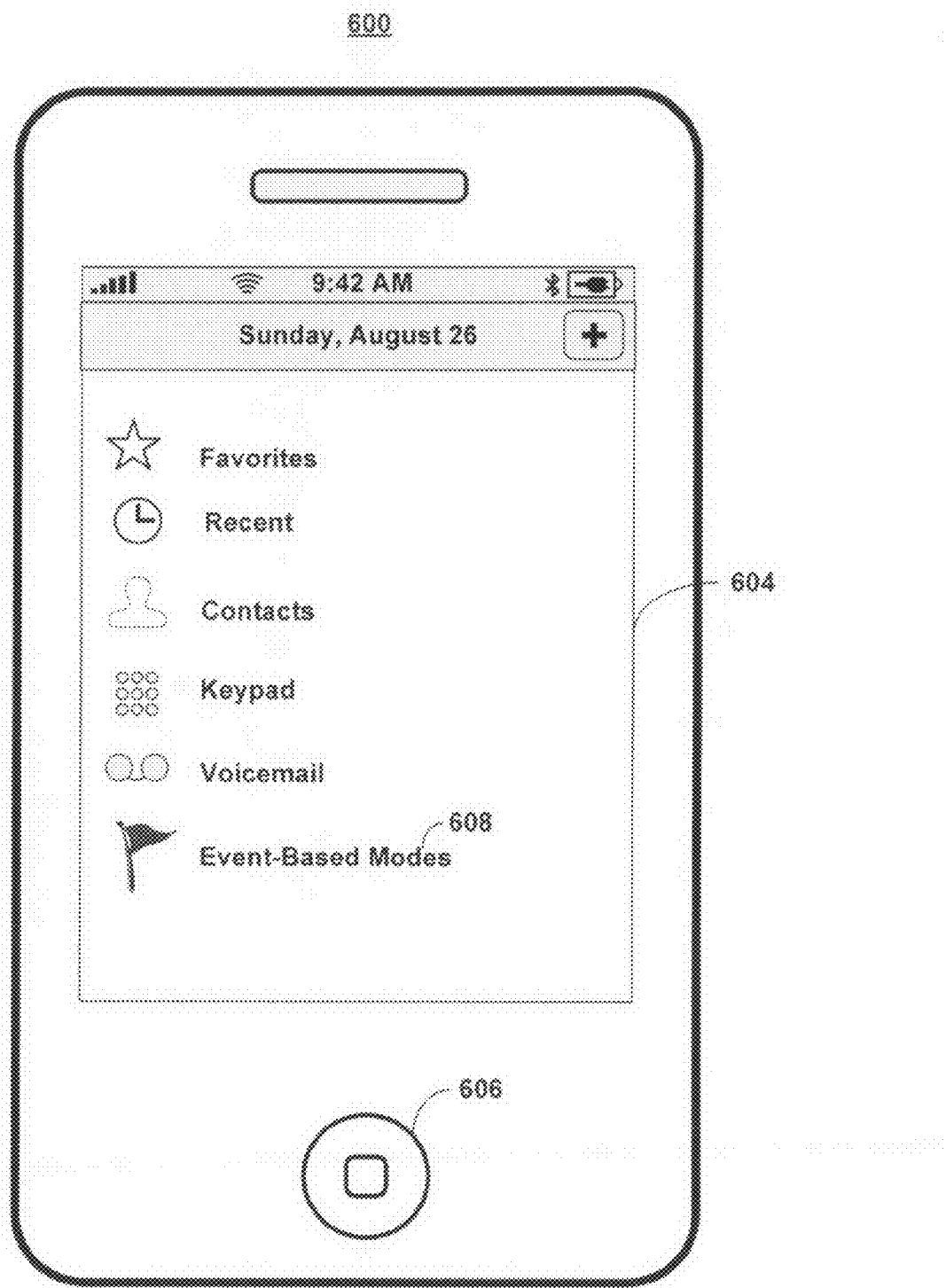
FIGS. 6A-6E are illustrative schematic views of the display of an electronic device in accordance with various embodiments of the invention.

FIGS. 6A-6E show various display screens for supporting location-based modes of operation on an electronic device 600. Electronic device 600 may include a display screen, such as display screen 604, and a user input component 606. Display screen 604 of FIG. 6A shows a main menu with several menu options. To access characteristic configurations related to event-based modes of operation, the user may select event-based modes menu option 608.

Figure 6B:
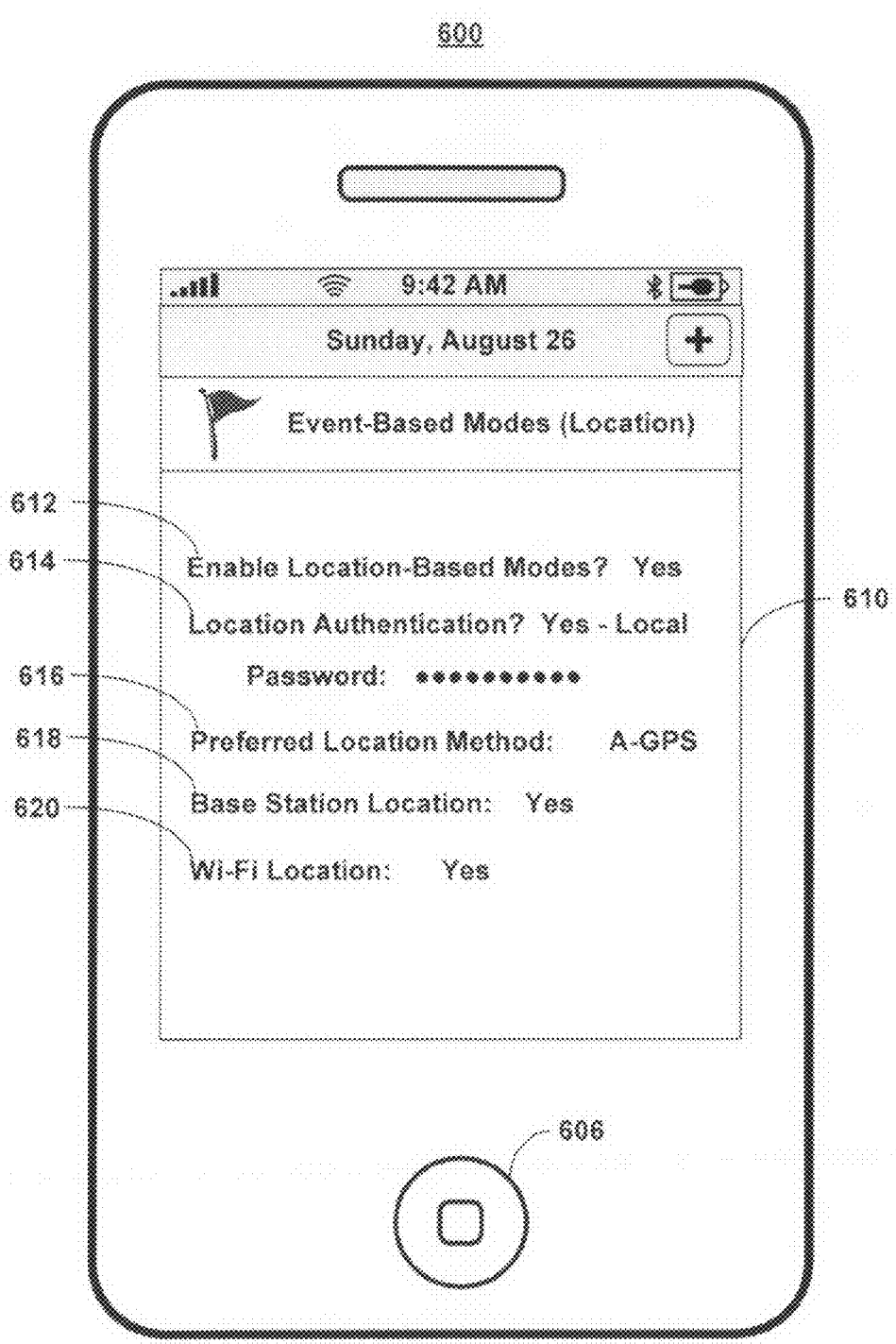

After the user selects event-based modes menu option 608, display screen 610 of FIG. 6B may be displayed on electronic device 600. Display screen 610 may include several common options and settings for supporting event-based modes of operation. In the embodiment of FIG. 6B, for example, several common options and settings for supporting location-based modes of operation are shown, although, it is to be understood that similar menus may be displayed for various other types of event-based modes, such as environment-based modes, calendar-based modes, usage-based modes, and news-based modes. For example, as shown in FIG. 6B, a user may selectively enable or disable location-based event modes via enable setting 612. In some embodiments, a user may associate a password with the location-based modes feature so that the location of the electronic device is not divulged without authorization. The user may select from local authentication or network authentication using authentication setting 614. Authentication setting 614 may prevent unauthorized servers or users from querying the device's location without authorization.

The user may also set the preferred location method using location method setting 616. The user may select any location method, including, for example, RF triangulation, GPS, and A-GPS. The user may also set the preferred location method to "none" so that any available method for determining the device's location may be used. A device's location may also be determined based on a base station, access point, or Wi-Fi network that the device is currently connected to (or that is within range). If base station location setting 618 is set to "Yes," then the base station with the strongest signal may be used to derive the device's location if the preferred location method fails or is unable to determine the device's location. Similarly, the user may set Wi-Fi location setting 620 to "Yes" to enable location detection based on the Wi-Fi network with the strongest signal.

Figure 6C:
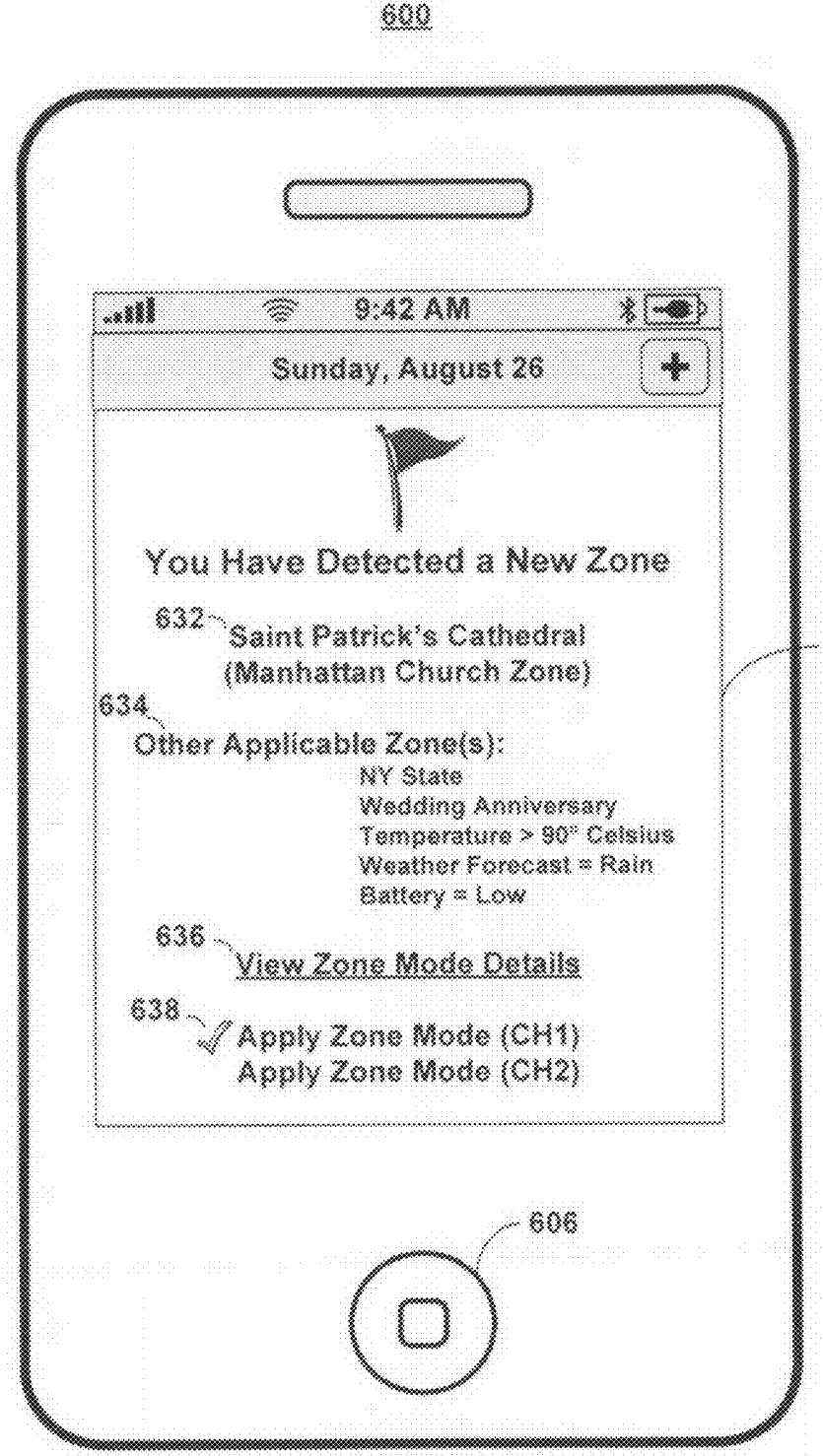

After electronic device 600 has detected a new event-based zone, display screen 630 of FIG. 6C may be displayed. Display screen 630 may notify the user that the device has detected a new zone and may display the name of the new zone in zone name area 632. For example, as shown in FIG. 6C, the device has detected a new event of entering the location-based zone of Saint Patrick's Cathedral. If the device is also detecting one or more other new event-based zones, these zones may be listed in other applicable zone(s) listing 634. To view the one or more modes of operation associated with the new zone, the user may select view zone mode details option 636. Finally, to apply one or more modes of operation associated with the new event-based zone, the user may navigate apply zone mode cursor 638 to the desired mode or modes. In some embodiments, a listing of all the modes associated with the zone may be displayed in display screen 630. In other embodiments, only the initial or mandatory mode may be displayed. The user may select apply zone mode cursor 638 to apply any one or more of the modes of operation displayed in display screen 630.

Figure 6D:
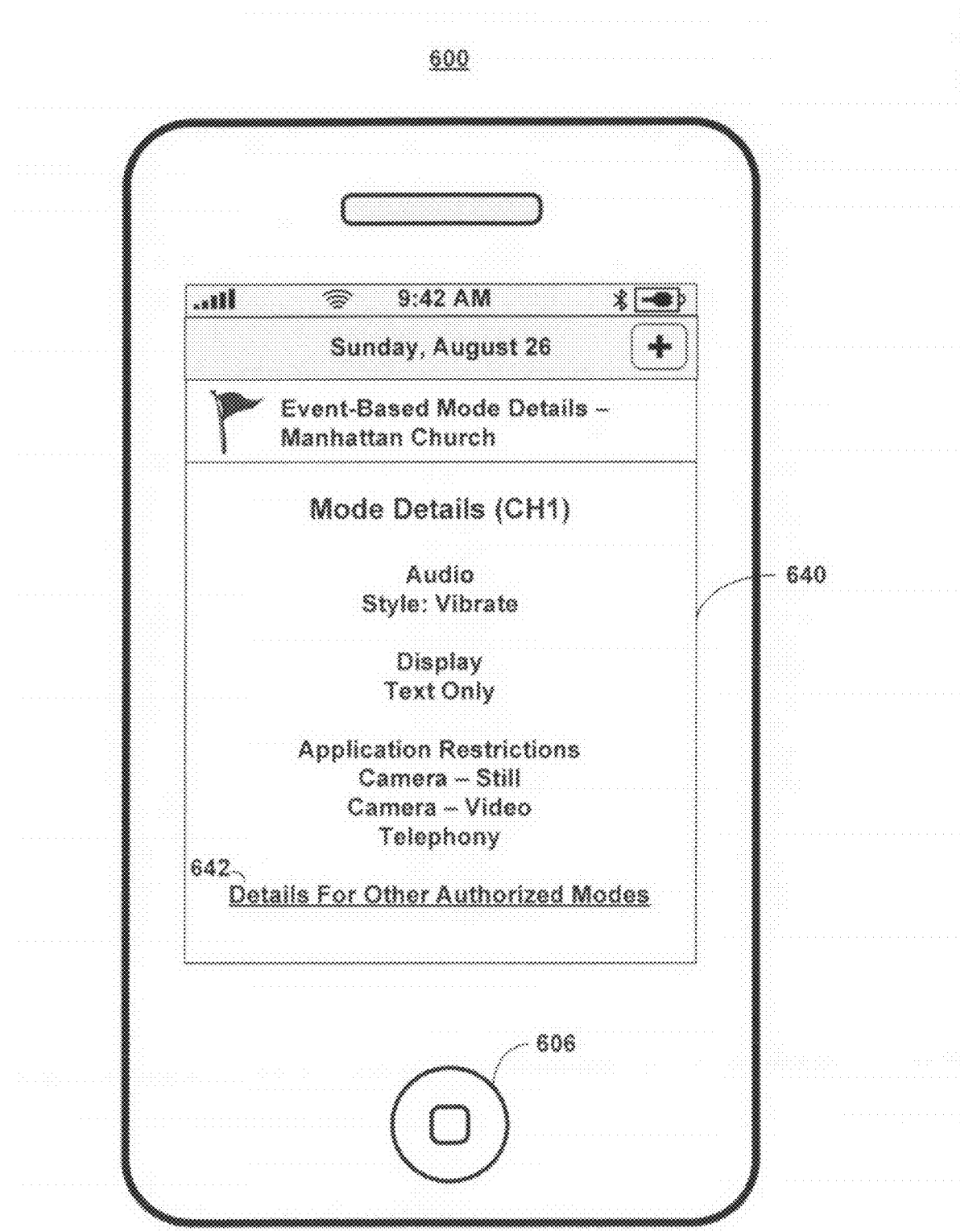

After selecting view zone mode details option 636, the user may be presented with mode details display screen 640 of FIG. 6D. Mode details display screen 640 may list the configuration characteristics associated with the initial or mandatory mode for the zone. As shown in the example of FIG. 6D, mode details display screen 640 lists the audio, display, and application restrictions associated with the "CH1" mode. To view details related to other valid modes of operation within the zone, the user may select other modes option 642. The user may also apply one of these other modes of operation (if permitted by the zone settings) after selecting other modes option 642.

Figure 6E:
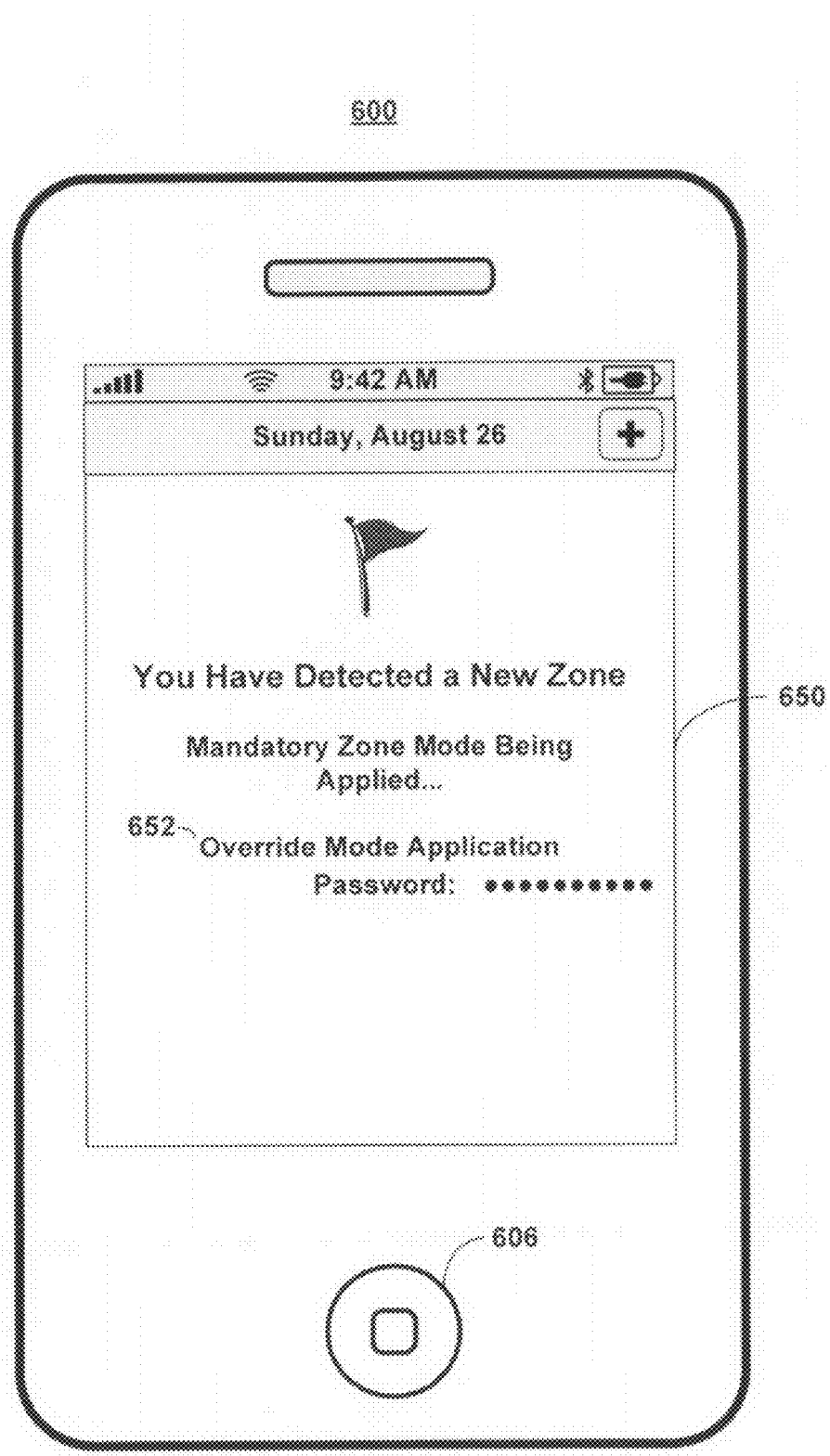

As described above, some zones are associated with a mandatory mode of operation. After the electronic device detects a new zone with a mandatory mode of operation associated with the zone, the mode of operation may be automatically applied to the device. As shown in FIG. 6E, mode application display screen 650 may inform the user that the device has detected a new event-based zone and that a mandatory mode of operation is being automatically applied. If the user wishes to abort the application of the mandatory mode, the user may select override option 652. In some embodiments, in order to override a mandatory mode of operation, the user must be authenticated (e.g., by entering a valid password).

Figure 7A:
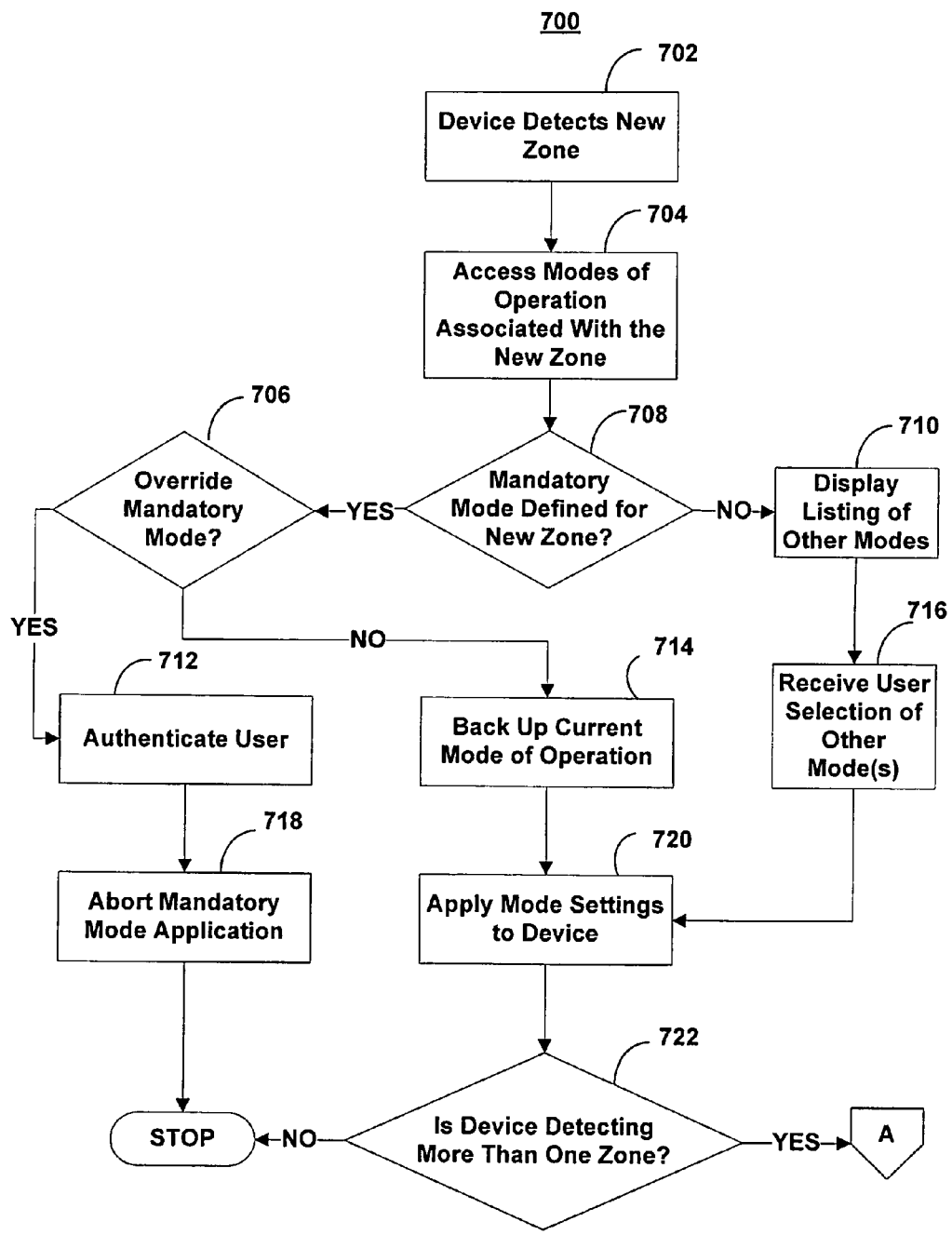
FIGS. 7A-9 are flowcharts of illustrative processes for supporting event-based modes of operation in accordance with various embodiments of the invention.
Figure 7B:
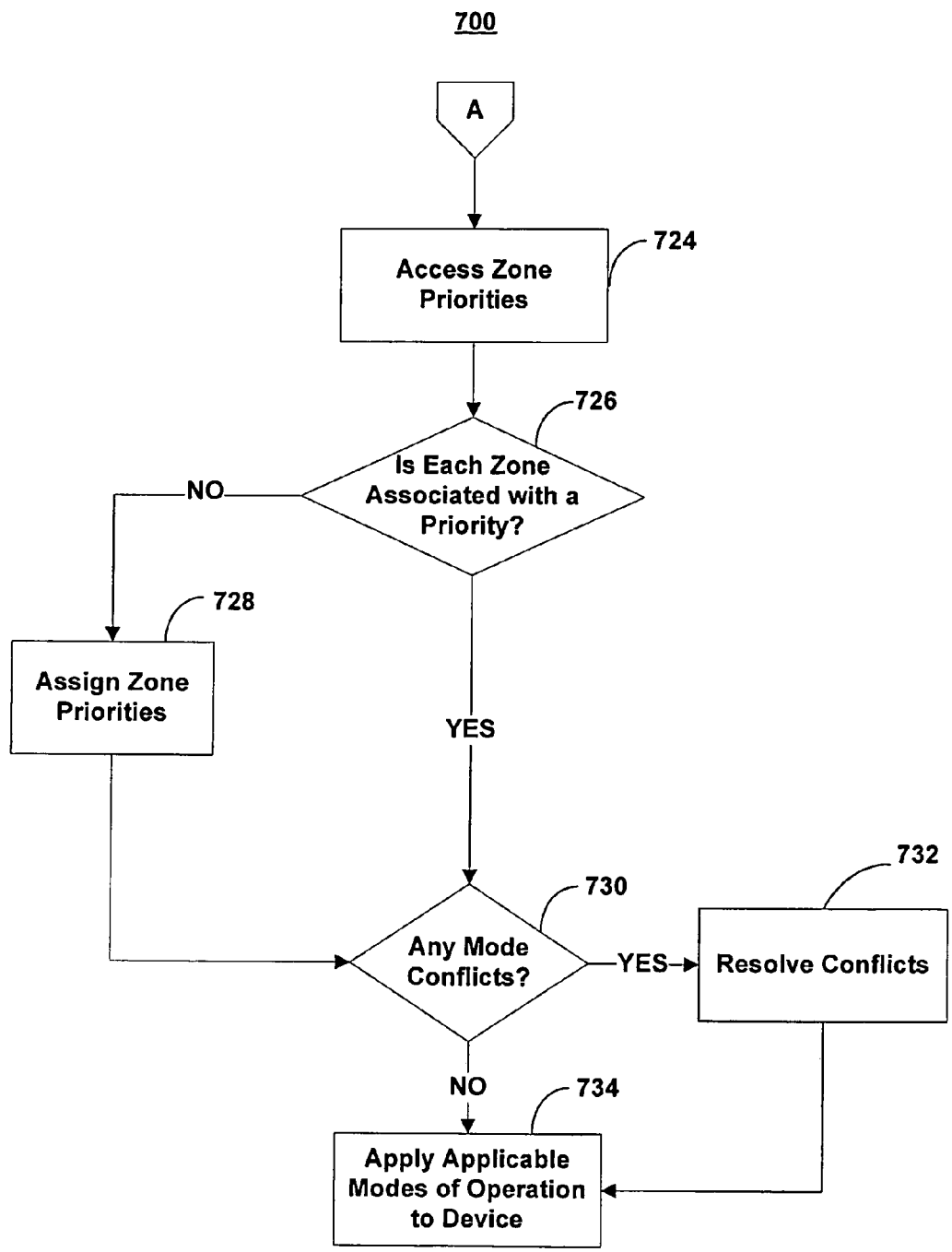

FIGS. 7A and 7B show an illustrative process for supporting event-based modes of operation on an electronic device in accordance with the invention. Process 700 of FIGS. 7A and 7B may begin with an electronic device detecting a new zone at step 702. For example, the device may be moved from one geographic location to another. As described above, a GPS receiver or RF triangulation sensor may be used to determine the location of the device at any suitable time. In addition, the device may use the signal strength of one or more wireless networks to determine its location. Other examples of the device detecting a new event may include detecting a change in ambient temperature about the device, receiving a new weather forecast with the device, or the charge of the device's battery lowering.

From this detected event information, the electronic device (e.g., device 100 of FIG. 1) may compare the event information with the information of any defined zone. For example, event column 218 (FIG. 2) may be accessed. The device may then execute a function call that returns the zone or zones the device is currently detecting based on the device's newly detected event information (e.g., geographic coordinate location-based event information).

At step 704, the mode or modes of operation associated with the new zone may be accessed. To access the modes of operation associated with the new zone, the electronic device may access data stored on a location data server, such as zone data server 402 (FIG. 4). Alternatively, zone compiler 408 (FIG. 4) may automatically transmit such data to the electronic device after zone compiler 408 determines that the device has detected a new zone. Zone information (including associated modes of operation) for certain zones may also be stored locally on the electronic device itself (e.g., in memory 110 or on storage device 112, both of FIG. 1).

In some embodiments, modes associated with common or popular zones (e.g., tourist destinations) in a certain geographic region may be automatically downloaded to or accessed by the device periodically or after the device has detected a new zone. Moreover, as another example, when a device enters a location-based zone defined by the city limits of Chicago, Ill., specific assets may be automatically added to the device, such as Chicago Police Department's contact information. As yet another example, when a device receives news information that the price of a certain stock has dipped below a certain level, specific assets may be automatically added to the device, such as a stock broker's contact information, or specific assets may be automatically cued or queued for use, such as the user's favorite song in order to lift his or her spirits. Each device may store a data structure similar to data structure 200 (FIG. 2) that may define the zones recognized by the device as well as their associated mode or modes of operation.

After accessing the modes of operation associated with the new zone at step 704, the device may determine if a mandatory mode of operation is defined for the new zone at step 708. For example, at step 708, the electronic device (e.g., device 100) may read one or more entries in a data structure, such as data structure 200 of FIG. 2. If the value in auto apply column 206 (FIG. 2) is set to true, then the mode identified by the mode identifier in initial mode column 216 (FIG. 2) may be a mandatory mode of operation associated with that zone.

If a mandatory mode is not defined for the zone, then at step 710 a listing of other valid modes for the zone may be displayed. For example, display screen 630 (FIG. 6C) may be displayed at step 710. The user may then select one or more of the displayed modes at step 716 in order to apply the selected mode or modes to the device.

If a mandatory mode of operation is defined for the new zone, then the user may be given an opportunity to override the application of that mandatory mode of operation to the device at step 706. For example, display screen 650 (FIG. 6E) may allow the user to authenticate himself or herself by entering a valid zone password. If the user has been successfully authenticated at step 712, then the application of the mandatory mode may be aborted at step 718.

If the user does not override the mandatory mode application at step 706, then the user's current mode of operation may be saved or backed up to the device or a network location at step 714. For example, the functionality, application settings, and asset arrangements currently in force on the device may be saved to memory 110 or on storage device 112 (both of FIG. 1). These characteristics may also be saved to a remote zone data server 402 (FIG. 4) or any other available network file server. As previously described, in some embodiments, a device or user profile may be maintained for the electronic device. In this case, the device profile or user profile may be saved instead of, or in addition to, saving the current mode of operation on the device.

After the device's current mode of operation is backed up at step 714, the mode settings associated with the mandatory mode of operation may be applied to the device at step 720. For example, Table 1, above, describes some of the more common settings, functionalities, and assets that may be adjusted using a mode of operation. Other characteristics not specifically included in Table 1 may also be adjusted. In order to apply the mode of operation to the device, an application process or subroutine may parse a mode definition file (e.g., mode definition file 510 of FIG. 5) and adjust the required configuration characteristics. Depending on the characteristics adjusted, a soft or hard reboot of the device may also be required in order for the changes to take effect. Mode of operation characteristics may be applied serially, one after another, or a batch process may apply the mode characteristics in parallel using one or more application threads. For example, one application thread may apply display settings and another application thread may apply volume settings. As another example, one application thread may add one or more new files of contact information to the device's list of contacts and another application thread may rearrange the priority and order of songs cued in a media player of the device.

After the mandatory or other valid mode of operation has been applied to the device at step 720, the device may determine if it is detecting or in more than one zone at step 722. If the device is detecting only one zone or event, then illustrative process 700 may stop. If the device is currently detecting more than one zone or event, illustrative process 700 may continue in FIG. 7B. For example, the device may be simultaneously located in the Saint Patrick's Cathedral zone, a New York City zone, and a New York State zone. As another example, the device may be located in the Saint Patrick's Cathedral zone and simultaneously receiving a new weather forecast.

If the device is detecting multiple zones, then at step 724 the zone priority of each zone that the device is currently detecting may be accessed. For example, priority column 220 of data structure 200 (FIG. 2) may be read for all zones the device is currently registered. If any zones are not associated with a zone priority at step 726, then at step 728 a zone priority may be assigned to each zone without a zone priority.

With respect to location-based zones, priorities may be assigned based on the relative size of all the zones in which the device is currently located. For example, in some embodiments, smaller zones may be automatically assigned higher priorities than larger zones (absent predefined zone priorities). Because zones of a smaller geographic area may be associated with more targeted mode of operation settings, assigning zone priorities based on the relative sizes of the zones may help resolve any mode conflicts in favor of the more localized zone. Generally, in other embodiments, the user or another party may specify the default zone priority assignment order through a profile setting or on a case by case basis when the conflict arises.

At step 730, electronic device 100 (FIG. 1) may determine if there are any mode conflicts as a result of two or more mandatory or selected modes of operation being associated with the one or more zones being detected by the device. For example, conflicting volume or display settings may be included in two zones with mandatory or selected modes of operation to be applied to the device. Any mode settings that conflict with other mode settings to be applied on the device may be considered mode conflicts. If any such mode conflicts exist at step 730, then the conflicts may be resolved at step 732. The conflicts may be resolved based on priority order of each of the conflicted modes, user selection, or any other suitable way. For example, if a location-based mode of operation requires that the device's ringer be silenced, yet a calendar-based mode of equal priority requires that the device's ringer be made louder when a particular person is calling the user (e.g., when the calendar-based event is associated with that particular person's birthday), the user or a third party or a profile setting may resolve the conflict as to which mode characteristic to apply. Otherwise, if no mode conflicts are detected at step 730, then the characteristic configurations of each applicable mode may be applied at step 734 without conflict.

In practice, one or more steps shown in illustrative process 700 may be combined with other steps, performed in any suitable order, performed in parallel (e.g., simultaneously or substantially simultaneously), or removed.

Figure 8:
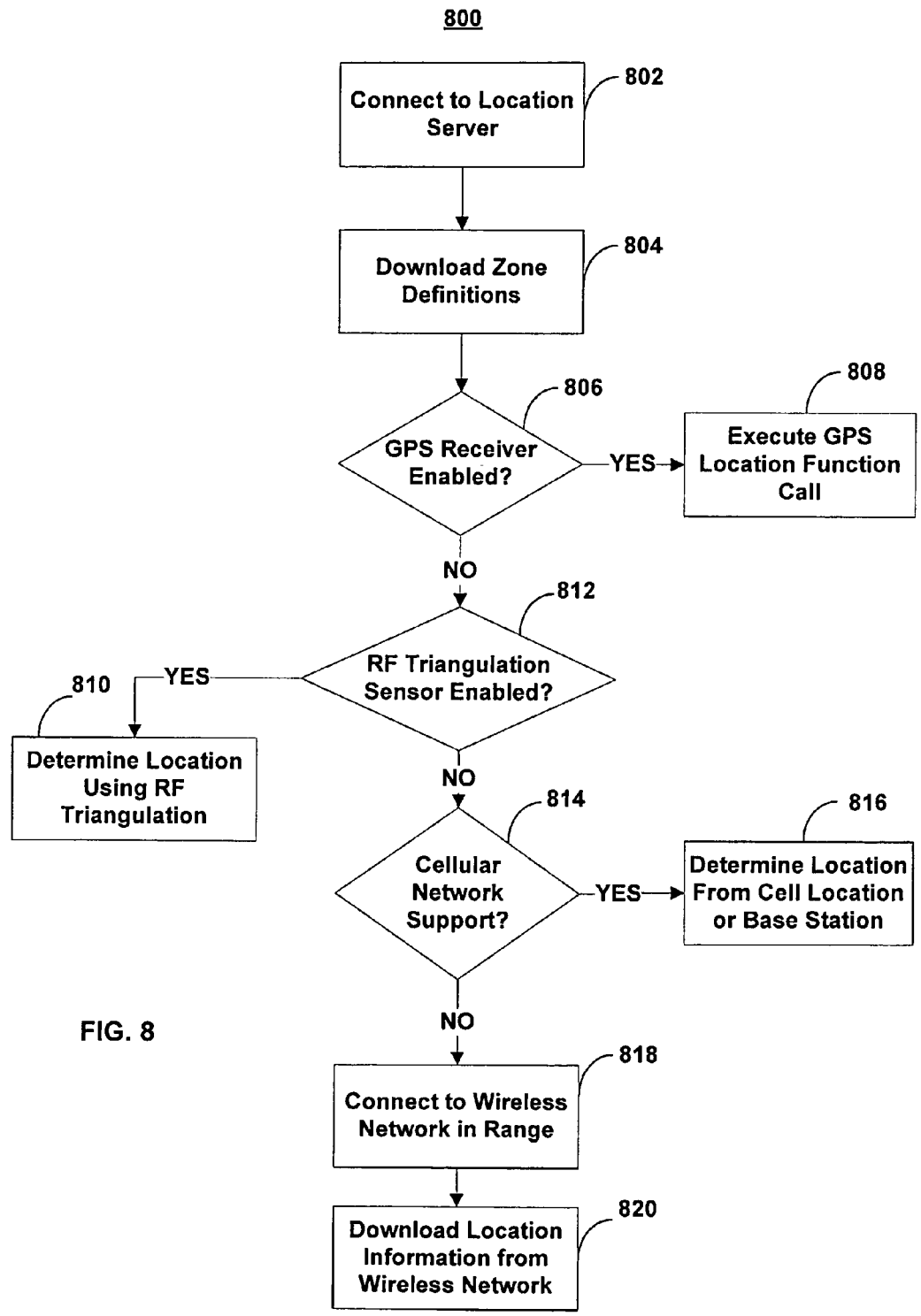

FIG. 8 shows an illustrative process 800 for determining the location of an electronic device. Since electronic devices may come in many varieties, several methods for determining the location of the device may be used. A single device may use one or more methods for determining its location depending on the number of location methods supported on the device. For example, some devices may have integrated GPS receivers, in which case the device may determine its geographic coordinates via a GPS location function call. Other devices may not support GPS (or cannot currently receive a GPS signal). For these devices, any number of other methods for determining the device's location may be used to supplement or replace the GPS location function.

For example, at step 802, the device may connect to a location server, such as zone data server 402 (FIG. 4). After connecting to the server, the device may download available zone definitions at step 804. In some embodiments, all the zone definitions available on the data server may be downloaded. In other embodiments, only a subset of all the zone definitions may be downloaded. The subset could depend, for example, on the last known location of the device. In order to save network bandwidth, devices may only download zone definitions for zones that the user has previously entered, zones within a predetermined geographic distance from the device's last known location, the most popular zones, or any other suitable subset of zones. The zone definitions may then be stored locally on the device in a format similar to data structure 200 (FIG. 2). Alternatively, the device may not need to connect to a server and may skip steps 802 and 804. Instead one or more zone and mode definitions may already be stored locally on the device.

At step 806, the device may determine if GPS functionality is currently enabled and available. For example, if electronic device 100 (FIG. 1) does not include a GPS receiver, the device may not support GPS functionality. If the device cannot lock or receive a GPS signal necessary to determine the device's current location, then the device may determine that GPS is not enabled or available at step 806. If GPS is enabled and available, a GPS location function call may be executed at step 808. The GPS function call may return the current geographic coordinates of the device.

If GPS is not enabled or available at step 806, then the device may determine if an RF triangulation detector or sensor is enabled or available at step 812. If RF triangulation is available, then the location of the device may be determined using RF triangulation or RF fingerprinting at step 810. Using RF triangulation, a device's location may be computed based upon the detected signal strength of one or more nearby wireless access points. RF triangulation may operate based on the assumption that the signal strength of one or more nearby wireless access points is a function of proximity to the access point. Although the strength of the signal alone may be used in simple RF triangulation techniques, more advanced RF triangulation may be used in some embodiments. These RF triangulation techniques may utilize the angle of the signal's approach to the device, the amount of time for the signal to reach the device, or any combination of the aforementioned measurements.

At step 810, RF fingerprinting may also be used. RF fingerprinting may compare the device's view of the network infrastructure (i.e., the strength of signals transmitted by infrastructure access points) with a database that contains an RF physical model of the coverage area. This database may be populated by either an extensive site survey or an RF prediction model of the coverage area.

If RF triangulation is not available at step 812, then at step 814 the device may determine if it supports connecting to a cellular network. For example, most mobile telephones operate on a cellular network with a set of fixed transceivers serving a number of mobile devices within a cell. If access to a cellular network is supported by the electronic device 100, then the location of the device may be derived from the cell the device is currently located in or the nearest base station or transmitter within the cell at step 816.

If neither GPS, RF triangulation, or cellular network support is available, then the device may attempt to connect to any wireless (e.g., Wi-Fi) network within range using any available network protocol at step 818. Once connected to the network, the device may download location information (e.g., geographic coordinates) from the wireless network at step 820. For example, the device may download its approximate geographic coordinates or location information associated with the wireless network.

Many other types of event-based information besides location-based information may be accessed by the device using one or more of the steps shown in illustrative process 800. For example, news-based event information may be fed onto the device from a website or remote system via the wireless network at step 820.

In practice, one or more steps shown in illustrative process 800 may be combined with other steps, performed in any suitable order, performed in parallel (e.g., simultaneously or substantially simultaneously), or removed. For example, although in the example of FIG. 8 GPS support is verified before RF triangulation or wireless network support, the user may specify a preferred location method order in some embodiments. Process 800 may be adjusted accordingly so that the device's location is determined by any available location method in any suitable order. Moreover, in practice, one or more steps shown in illustrative process 800 may be combined with other steps, performed in any suitable order, performed in parallel (e.g., simultaneously or substantially simultaneously), or removed.

Figure 9:
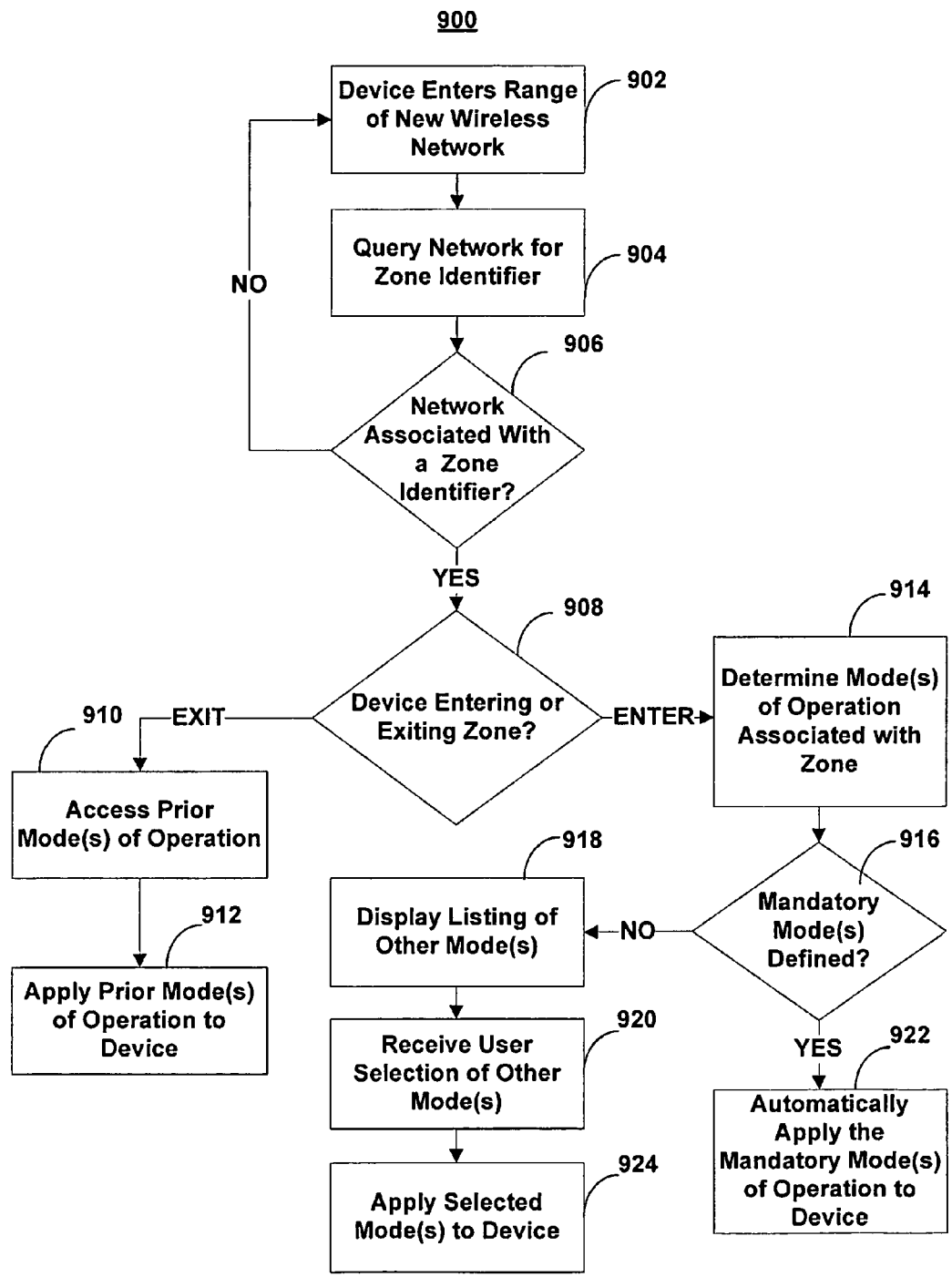

FIG. 9 shows an illustrative process 900 for supporting location-based modes of operation on an electronic device. At step 902, the device may enter the signal range of a new wireless network. For example, if the device includes Wi-Fi support, then the device may enter the range of a Wi-Fi network at step 902. At step 904, the device may query the network for a location-based zone identifier that is associated with the network. For example, the network may be associated with a unique zone name or alphanumeric identifier. If, at step 906, the network is not associated with a zone identifier, the device may return to step 902. Some networks that may be in range of the device may not support or be compatible with location-based modes of operation. These wireless networks may not return a valid zone identifier when queried by the device.

If the wireless network is associated with a valid zone identifier, then at step 908 the device may determine if it is entering or exiting the zone at step 908. In some embodiments, wireless access points may be positioned only around the perimeter of a zone. For example, the zone may be too large for the wireless network to cover the entire zone. To create a zone covering New York State, for example, wireless access points may be positioned on major roads and highways at the state border. Each wireless access point may be associated with the same zone identifier. The number of zone crossings may then be used to determine if the device is entering or exiting the zone at step 908. In other embodiments, the zone may be fully covered by a wireless network. In such embodiments, a device may be located within a zone whenever the device is in range of the wireless network servicing that zone (or the SNR or signal strength of the network signal is above some threshold).

If it is determined that the device is exiting a zone, then at step 910 the device's prior mode or modes ("mode(s)") of operation may be accessed. For example, as previously described, the prior mode(s) of operation may be backed up to the device or a network server (e.g., data server 402 of FIG. 4). At step 912, this prior mode or modes of operation may then be applied to the device. In this way, one or more of the mode(s) of operation prior to entering the new zone may be automatically restored or restored if desired by the user.

If the device is entering a new zone, then at step 914 the device may download the valid mode(s) of operation associated with the new zone. For example, electronic device 100 (FIG. 1) may access a data server, such as zone data server 402 (FIG. 4), in order to download the valid mode(s) of operation for the new zone. Alternatively, information may be stored locally on the device that describes the valid modes of operation for the new zone. If a mandatory mode of operation is associated with the new zone at step 916, then the one or more mandatory mode(s) of operation may be applied to the device at step 922. For example, display screen 650 (FIG. 6E) may be displayed on the device while the new mandatory mode(s) of operation are applied.

If a mandatory mode of operation is not associated with the new zone, then at step 918 a listing of one or more other modes associated with the new zone may be displayed at step 918. For example, display screen 630 (FIG. 6C) may be displayed with apply zone mode cursor 638 (FIG. 6C). This cursor may be used to select one or more modes of operation at step 920. Finally, the selected mode or modes of operation may be applied to the device at step 924.

In practice, one or more steps shown in illustrative process 900 may be combined with other steps, performed in any suitable order, performed in parallel (e.g., simultaneously or substantially simultaneously), or removed.

While there have been described systems and methods for supporting various event-based modes of operation on an electronic device in response to detecting various life events, it is to be understood that many changes may be made therein without departing from the spirit and scope of the invention. For example, many other types of device configuration characteristics may be applied by an event-based mode of operation according to the invention, such as sensitivity of a touch screen, web feed subscriptions, user interface color and language schemes, parental controls, uploading and downloading bit rate thresholds, and the like. Moreover, event-based modes of operation may be associated with many other types of life events according to the invention, such as the positioning of a user (e.g., a user's hand) with respect to the electronic device, a particular type of file or application being loaded onto or deleted from the device, a particular gas or liquid being detected in the environment of the device, and the like. Those skilled in the art will appreciate that the invention can be practiced by other than the described embodiments, which are presented for purposes of illustration rather than of limitation, and the invention is limited only by the claims which follow.

What is claimed is:

1. A method for supporting location-based modes of operation on an electronic device, the method comprising:
    accessing location information associated with the electronic device;
    determining, based at least in part on the accessed location information, if the electronic device is located within at least one location-based zone; and
    in response to determining that the electronic device is located within the at least one location-based zone, applying at least one location-based mode of operation to the electronic device, wherein the applying to the electronic device the at least one location-based mode of operation comprises altering the accessibility of at least one asset to a user of the electronic device, wherein the at least one asset comprises a media data asset or electronic communication data asset stored on the electronic device, and wherein the altering the accessibility of the at least one asset includes changing the priority of a first asset having a first visual presentation with respect to a second asset having a second visual presentation and changing the visual presentation of the first asset or the second asset based on the changed priority of the first asset and the second asset.

2. The method of claim 1, further comprising restricting the re-alteration of the at least one asset while the electronic device is located within the at least one location-based zone.

3. The method of claim 1, wherein the applying further comprises one of (1) disabling at least one function of the electronic device and (2) enabling at least one function of the electronic device.

4. The method of claim 3, wherein the one of disabling and enabling the at least one function respectively comprises one of (1) disabling at least one network interface on the electronic device and (2) enabling at least one network interface on the electronic device.

5. The method of claim 1, wherein the applying further comprises adjusting at least one of (1) an audio setting on the electronic device and (2) a display setting on the electronic device.

6. The method of claim 1, wherein the altering the accessibility of the at least one asset comprises loading the at least one asset onto the electronic device.

7. The method of claim 1, wherein the accessing the location information associated with the electronic device comprises determining the location of the electronic device using at least one of (1) a global positioning system receiver, (2) a triangulation sensor, and (3) a communications network connection.

8. The method of claim 1, wherein the determining if the electronic device is located within the at least one location-based zone comprises:
    accessing zone information;
    comparing the accessed location information to the accessed zone information; and
    determining if the electronic device is located within the at least one location-based zone based at least in part on the comparison.

9. The method of claim 8, wherein the accessing the zone information comprises at least partially accessing the zone information from at least one of (1) memory located on the electronic device and (2) a server external to the electronic device.

10. The method of claim 8, wherein the at least one location-based zone comprises at least one bounded geographic region, and wherein the accessing the zone information comprises accessing geographic coordinates for the at least one bounded geographic region.

11. The method of claim 1, wherein the at least one location-based zone comprises at least one bounded geographic region, and wherein the at least one bounded geographic region comprises at least two non-contiguous geographic regions.

12. The method of claim 1, wherein the applying the at least one location-based mode of operation to the electronic device comprises:
    accessing mode information associated with the at least one location-based zone; and
    applying to the electronic device the accessed mode information, and wherein the accessing the mode information comprises at least partially accessing the mode information from at least one of (1) memory located on the electronic device and (2) a server external to the electronic device.

13. The method of claim 1, further comprising backing up at least one configuration characteristic of the electronic device before the applying the at least one location-based mode of operation to the electronic device.

14. The method of claim 13, further comprising:
determining when the electronic device is no longer located within the at least one location-based zone; and
in response to the determining that the electronic device is no longer located in the at least one location-based zone, restoring to the electronic device the backed up at least one configuration characteristic.

15. A system for supporting location-based modes of operation on an electronic device, the system comprising:
memory configured to store zone information and mode information about at least one location-based zone; and
the electronic device, the electronic device comprising:
a location detection module configured to determine the location of the electronic device; and
a control module coupled to the location detection module, wherein the control module is configured to:
access the stored zone information about the at least one location-based zone;
compare the determined location of the electronic device to the accessed zone information;
access the stored mode information based at least in part on the comparison; and
apply at least one location-based mode of operation to the electronic device based at least in part on the accessed mode information, wherein the application of the at least one location-based mode of operation comprises altering the accessibility of at least one asset to a user of the electronic device, wherein the at least one asset comprises a media data asset or electronic communication data asset stored on the electronic device, and wherein the altering the accessibility of the at least one asset includes changing the priority of a first asset having a first visual presentation with respect to a second asset having a second visual presentation and changing the visual presentation of the first asset or the second asset based on the changed priority of the first asset or the second asset.

16. The system of claim 15, wherein at least a portion of the memory is located on one of (1) the electronic device and (2) a server external to the electronic device.

17. The system of claim 15, wherein the location detection module comprises at least one of (1) a global positioning system receiver, (2) a triangulation sensor, (3) a communications network receiver, and (4) program logic configured to compute the current geographic location of the electronic device.

18. The system of claim 15, wherein the at least one location-based mode of operation comprises an adjustment of at least one of (1) an input functionality of the electronic device, (2) an output functionality of the electronic device, (3) an application function of the electronic device, (4) a media asset of the electronic device, and (5) a communication asset of the electronic device.

19. A method for supporting environment-based modes of operation on an electronic device, the method comprising:
accessing environment information associated with the electronic device;
determining, based at least in part on the accessed environment information, if the electronic device is experiencing at least one environment-based event; and
in response to determining that the electronic device is experiencing the at least one environment-based event, applying at least one environment-based mode of operation to the electronic device, wherein the applying to the electronic device the at least one environment-based mode of operation comprises altering the accessibility of at least one asset to a user of the electronic device, wherein the at least one asset comprises a media data asset or electronic communication data asset stored on the electronic device, and wherein the altering the accessibility of the at least one asset includes changing the priority of a first asset having a first visual presentation with respect to a second asset having a second visual presentation and changing the visual presentation of the first asset or the second asset based on the changed priority of the first asset and the second asset.

20. The method of claim 19, further comprising restricting the re-alteration of the at least one asset while the electronic device is experiencing the at least one environment-based event.

21. The method of claim 19, wherein the applying further comprises one of (1) disabling at least one function of the electronic device and (2) enabling at least one function of the electronic device.

22. The method of claim 21, wherein the one of disabling and enabling the at least one function respectively comprises one of (1) disabling at least one network interface on the electronic device and (2) enabling at least one network interface on the electronic device.

23. The method of claim 19, wherein the applying further comprises adjusting at least one of (1) an audio setting on the electronic device and (2) a display setting on the electronic device.

24. The method of claim 19, wherein the altering the accessibility of the at least one asset comprises loading the at least one asset onto the electronic device.

25. The method of claim 19, wherein the accessing the environment information associated with the electronic device comprises determining at least one environmental condition of the electronic device using at least one of (1) an accelerometer, (2) a gyroscope, (3) a magnetometer, (4) a light sensor, (5) a linear velocity sensor, (6) a thermal sensor, (7) an acoustic sensor, (8) a sonar sensor, (9) a radar sensor, (10) an image sensor, (11) a video sensor, and (12) an electrical charge sensor.

26. The method of claim 19, wherein the determining if the electronic device is experiencing the at least one environment-based event comprises:
accessing event information;
comparing the accessed environment information to the accessed event information; and
determining if the electronic device is experiencing the at least one environment-based event based at least in part on the comparison.

27. The method of claim 26, wherein the accessing the event information comprises at least partially accessing the event information from at least one of (1) memory located on the electronic device and (2) a server external to the electronic device.

28. The method of claim 26, wherein the at least one environment-based event comprises at least one threshold level for at least one environmental condition, and wherein the accessing the event information comprises accessing a value for the at least one threshold level.

29. The method of claim 19, wherein the at least one environment-based event comprises at least two distinct ranges of values for at least one environmental condition.

30. The method of claim 19, wherein the applying the at least one environment-based mode of operation to the electronic device comprises:
    accessing mode information associated with the at least one environment-based event; and
    applying to the electronic device the accessed mode information, and wherein the accessing the mode information comprises at least partially accessing the mode information from at least one of (1) memory located on the electronic device and (2) a server external to the electronic device.

31. The method of claim 19, further comprising backing up at least one configuration characteristic of the electronic device before the applying the at least one environment-based mode of operation to the electronic device.

32. The method of claim 31, further comprising:
    determining when the electronic device is no longer experiencing the at least one environment-based event; and
    in response to the determining that the electronic device is no longer experiencing the at least one environment-based event, restoring to the electronic device the backed up at least one configuration characteristic.

33. The method of claim 1, wherein the at least one asset comprises at least one of a song, podcast, video, video game, picture, literature, news article, e-mail, text message, instant message, contact information, and internet link.

34. The method of claim 1, wherein the altering the accessibility of the at least one asset comprises changing the priority of the at least one asset with respect to at least one other asset, and wherein the changing the priority comprises reordering the at least one asset with respect to the at least one other asset in a list.

35. The method of claim 1, wherein metadata of the at least one asset is associated with the at least one location-based zone.

36. The method of claim 1, wherein the at least one asset comprises at least one piece of contact information associated with the at least one location-based zone.

37. The method of claim 1, wherein the altering comprises loading the at least one asset onto the electronic device, and wherein the loading comprises adding to the electronic device a first piece of contact information that is associated with the at least one location-based zone.

38. The method of claim 19, wherein the at least one asset comprises at least one of a song, podcast, video, video game, picture, literature, news article, e-mail, text message, instant message, contact information, and internet link.

39. The method of claim 19, the altering the accessibility of the at least one asset comprises changing the priority of the at least one asset with respect to at least one other asset, and wherein the changing the priority comprises reordering the at least one asset with respect to the at least one other asset in a list.

40. The method of claim 1, wherein the altering the accessibility of the at least one asset comprises removing the at least one asset from the electronic device.

41. The method of claim 1, wherein the changing the priority comprises at least one of cueing the at least one asset and automatically playing the at least one asset.

42. The method of claim 1, wherein the altering comprises removing the at least one asset from the electronic device, and wherein the removing comprises removing from the electronic device a first piece of contact information that is not associated with the at least one location-based zone.

43. The system of claim 15, wherein the at least one asset comprises at least one of a song, podcast, video, video game, picture, literature, news article, e-mail, text message, instant message, contact information, and internet link.

44. The system of claim 15, wherein the changing the priority comprises reordering the at least one asset with respect to the at least one other asset in a list.

45. The system of claim 15, wherein the altering comprises loading the at least one asset onto the electronic device, and wherein the loading comprises adding to the electronic device a first piece of contact information that is associated with the at least one location-based zone.

46. The system of claim 15, wherein the changing the priority comprises at least one of cueing the at least one asset and automatically playing the at least one asset.

47. The system of claim 15, wherein the altering comprises removing the at least one asset from the electronic device, and wherein the removing comprises removing from the electronic device a first piece of contact information that is not associated with the at least one location-based zone.

48. The method of claim 19, wherein the altering the accessibility of the at least one asset comprises removing the at least one asset from the electronic device.

49. The method of claim 19, wherein the changing the priority comprises at least one of cueing the at least one asset and automatically playing the at least one asset.

50. The method of claim 1, wherein changing the visual presentation of the first asset or the second asset includes displaying the first or the second asset in a larger font or different color than other assets on a visual output component of the device.

* * * * *